United States Patent
Kuwata et al.

(10) Patent No.: US 9,660,979 B2
(45) Date of Patent: May 23, 2017

(54) INFORMATION PROCESSING SYSTEM, INFORMATION PROCESSING APPARATUS, AND METHOD

(71) Applicant: Sony Corporation, Tokyo (JP)

(72) Inventors: Masayuki Kuwata, Tokyo (JP); Shuji Okegawa, Chiba (JP); Yuji Matsui, Tokyo (JP)

(73) Assignee: SONY CORPORATION, Tokyo (JP)

(*) Notice: Subject to any disclaimer, the term of this patent is extended or adjusted under 35 U.S.C. 154(b) by 186 days.

(21) Appl. No.: 14/079,469

(22) Filed: Nov. 13, 2013

(65) Prior Publication Data
US 2014/0123262 A1 May 1, 2014

Related U.S. Application Data

(60) Division of application No. 12/640,659, filed on Dec. 17, 2009, now abandoned, which is a continuation of
(Continued)

(30) Foreign Application Priority Data

Jul. 23, 2001 (JP) ................................ 2001-221207

(51) Int. Cl.
*H04L 29/06* (2006.01)
*H04N 1/00* (2006.01)
(Continued)

(52) U.S. Cl.
CPC ........ *H04L 63/083* (2013.01); *G06F 17/3089* (2013.01); *H04N 1/00132* (2013.01);
(Continued)

(58) Field of Classification Search
CPC ...... H04L 67/104; G06Q 10/10; G06Q 30/02; H04N 1/00244; H04N 1/00132;
(Continued)

(56) References Cited

U.S. PATENT DOCUMENTS 6,005,679 A    12/1999    Haneda
6,317,141 B1 *   11/2001   Pavley et al. ................. 715/732
(Continued)

FOREIGN PATENT DOCUMENTS

JP         9-050436       2/1997
JP         9-293013      11/1997
(Continued)

OTHER PUBLICATIONS

Corcoran et al., Internet Connectivity Solutions for Digital Photography, Aug. 2000 [retrieved May 16, 2016], IEEE Transactions on Consumer Electronics, vol. 46, No. 3, pp. 494-498. Retrieved from the Internet: http://ieeexplore.ieee.org/xpls/abs_all.jsp?arnumber=883400&tag=1.*
(Continued)

*Primary Examiner* — Matthew Bella
*Assistant Examiner* — Dennis Rosario
(74) *Attorney, Agent, or Firm* — Haug Partners LLP; William S. Frommer

(57) ABSTRACT

An information processing system and an information processing apparatus and method for transmitting image data from a portable terminal apparatus, to a different apparatus through a network so that the image data may be managed by the different apparatus. A camcorder image station has a folder for each user of a camcorder and has, in each of the folders, 10 sub folders of album 1 to album 10 to each of which a name is applied in advance. The user of the camcorder transmits images picked up by the user to the camcorder image station so that the images are registered into a predetermined album. The camcorder has an album list of 10 albums of album 1 to album 10 in advance and selects an album of one of the names from within the list to designate an album into which image data should be uploaded.

8 Claims, 29 Drawing Sheets

Related U.S. Application Data application No. 10/381,231, filed as application No. PCT/JP02/07406 on Jul. 23, 2002, now Pat. No. 7,664,342.

(51) Int. Cl.
*G06F 17/30* (2006.01)
*H04N 21/4223* (2011.01)

(52) U.S. Cl.
CPC ..... *H04N 1/00137* (2013.01); *H04N 1/00151* (2013.01); *H04N 1/00156* (2013.01); *H04N 1/00172* (2013.01); *H04N 1/00196* (2013.01); *H04N 1/00244* (2013.01); *H04N 21/4223* (2013.01); *H04N 2201/001* (2013.01)

(58) Field of Classification Search
CPC .......... H04N 1/00196; H04N 1/00137; H04N 1/00156; G06F 3/0482; G06F 3/04883; G06F 3/04842; G06F 3/04817; G06F 17/3028

See application file for complete search history.

(56) References Cited

U.S. PATENT DOCUMENTS

| | | | |
|---|---|---|---|
| 6,453,361 B1 * | 9/2002 | Morris | H04N 1/00132 709/203 |
| 6,459,511 B1 | 10/2002 | Haneda | |
| 6,507,363 B1 | 1/2003 | Anderson et al. | |
| 6,567,983 B1 | 5/2003 | Shiimori | |
| 6,574,377 B1 | 6/2003 | Cahill et al. | |
| 6,636,259 B1 * | 10/2003 | Anderson | H04N 1/00151 348/14.04 |
| 6,686,970 B1 | 2/2004 | Windle | |
| 6,816,189 B2 * | 11/2004 | Nagaoka | H04N 5/772 348/231.2 |
| 6,853,980 B1 | 2/2005 | Ying et al. | |
| 6,930,709 B1 | 8/2005 | Creamer et al. | |
| 6,944,700 B2 * | 9/2005 | Bateman | G06F 1/1632 348/375 |
| 6,950,800 B1 * | 9/2005 | McIntyre et al. | 705/1.1 |
| 6,957,040 B1 | 10/2005 | Tanaka | |
| 7,007,062 B1 | 2/2006 | Serenyi et al. | |
| 7,117,519 B1 | 10/2006 | Anderson et al. | |
| 7,327,387 B2 | 2/2008 | Tanaka et al. | |
| 7,454,090 B2 | 11/2008 | Wilcock et al. | |
| 7,664,342 B2 | 2/2010 | Kuwata et al. | |
| 7,895,334 B1 * | 2/2011 | Tu | H04L 63/0272 709/227 |
| 2001/0002471 A1 | 5/2001 | Ooish | |
| 2001/0028363 A1 | 10/2001 | Nomoto et al. | |
| 2001/0029522 A1 | 10/2001 | Yoshimine et al. | |
| 2002/0010722 A1 | 1/2002 | Takayama | |
| 2002/0016819 A1 | 2/2002 | Sugimoto et al. | |
| 2002/0032714 A1 | 3/2002 | Monobe | |
| 2002/0097259 A1 | 7/2002 | Marshall et al. | |
| 2002/0174036 A1 | 11/2002 | Coyle | |
| 2003/0140314 A1 | 7/2003 | Takahara | |

FOREIGN PATENT DOCUMENTS

| | | |
|---|---|---|
| JP | 2000-357143 | 12/2000 |
| WO | WO 01 28249 | 4/2001 |
| WO | WO 01 37260 | 5/2001 |

OTHER PUBLICATIONS

Yagawa et al., The Digital Album: A Personal File-tainment System, Jun. 17-23, 1996 [retrieved May 16, 2016], 1996 Proceedings of the 3rd IEEE International Conference on Multimedia Computing and Systems, pp. 433-439. Retrieved from the Internet: http://ieeexplore.ieee.org/xpls/abs_all.jsp?arnumber=535010.*

\* cited by examiner

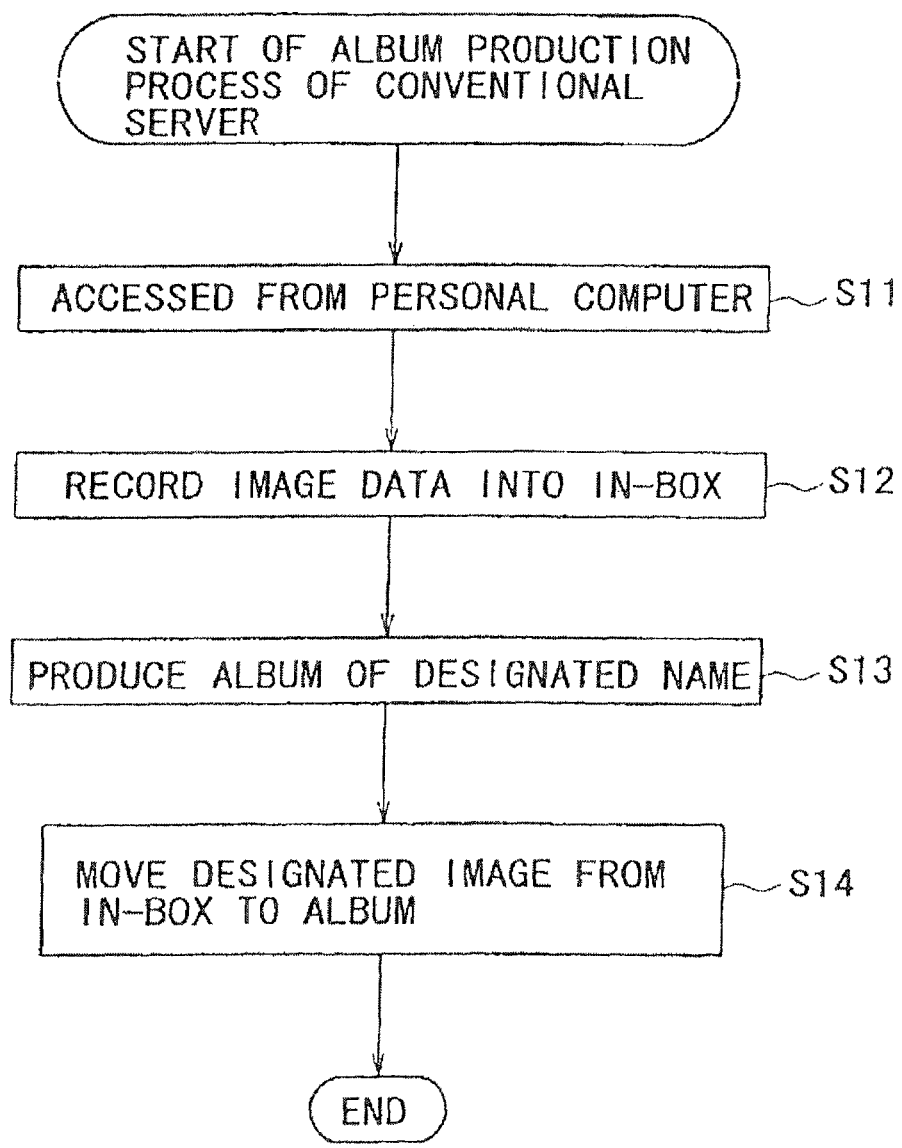

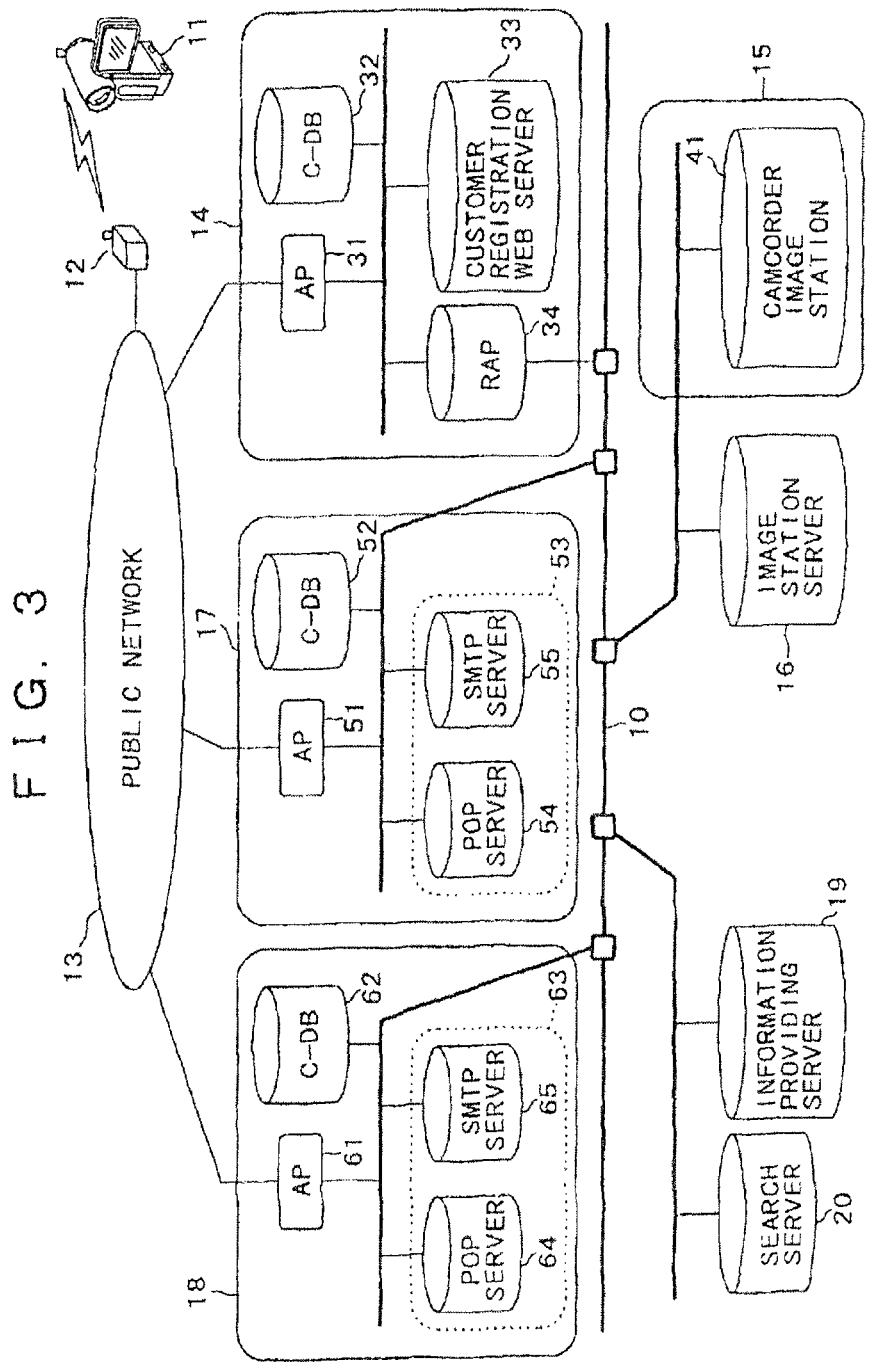

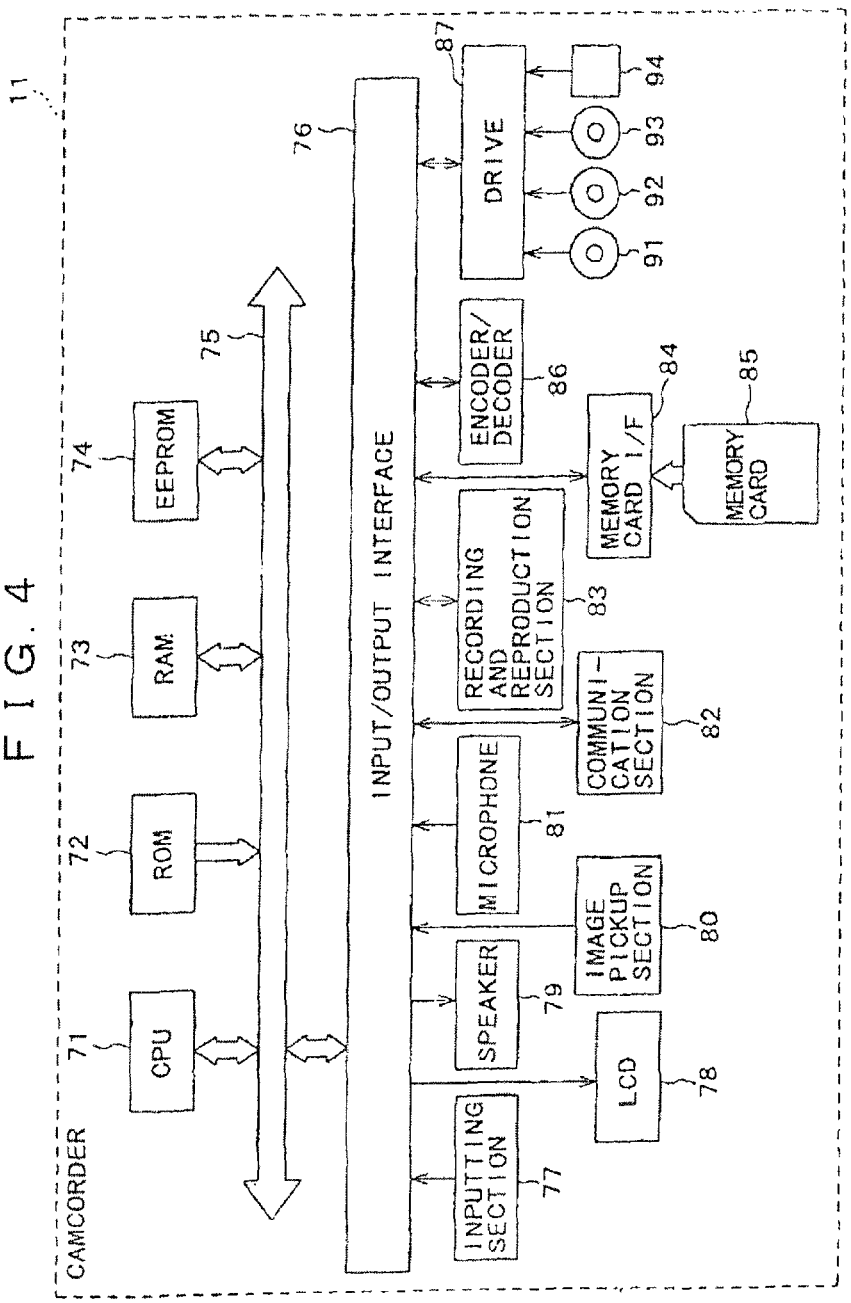

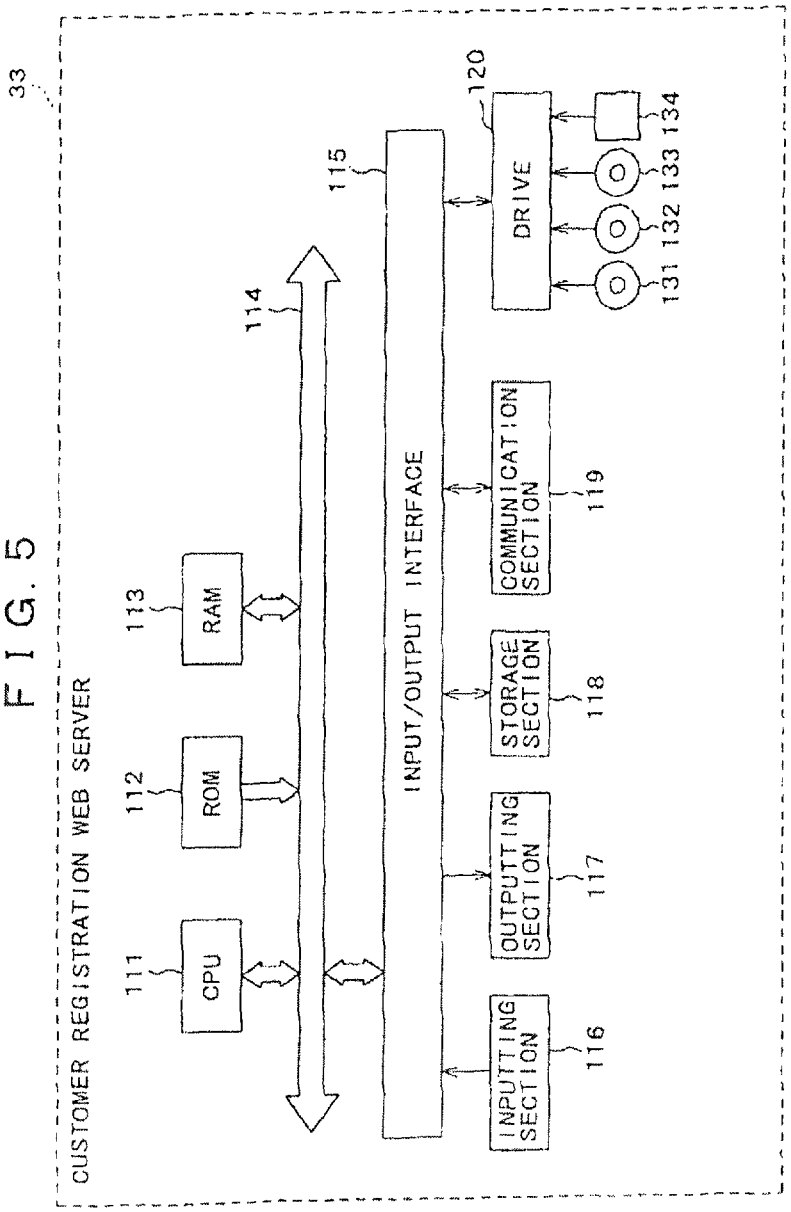

F I G. 3 0
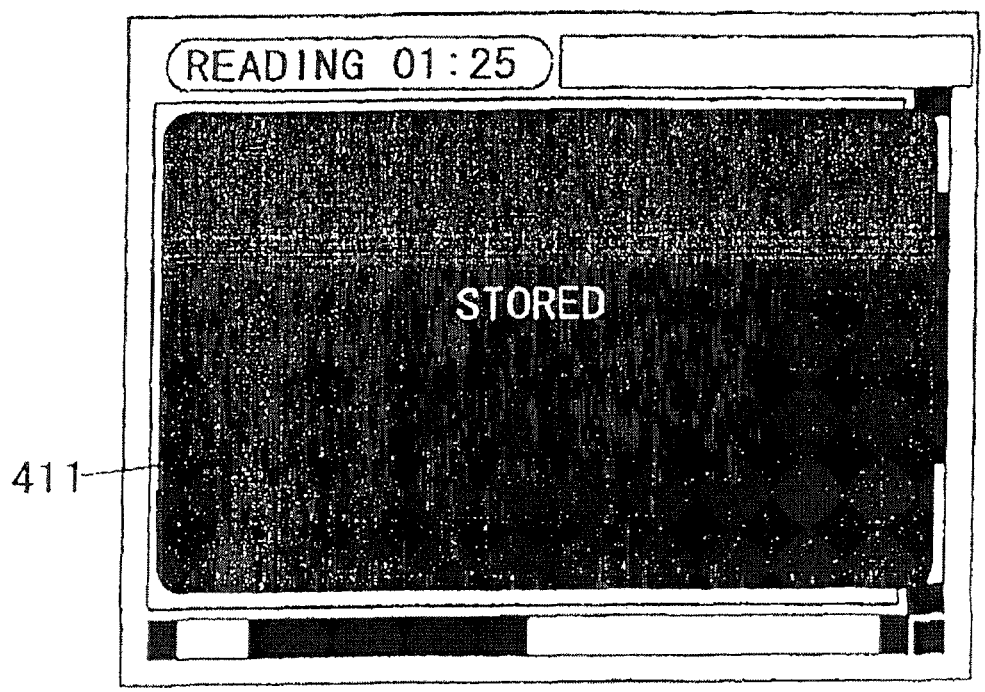

F I G. 3 6
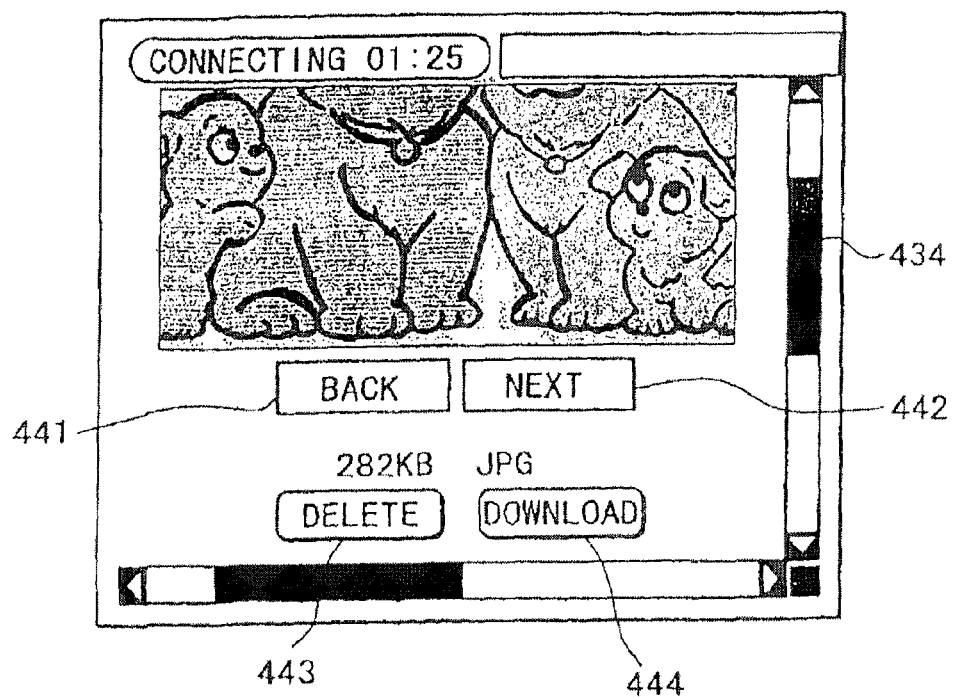

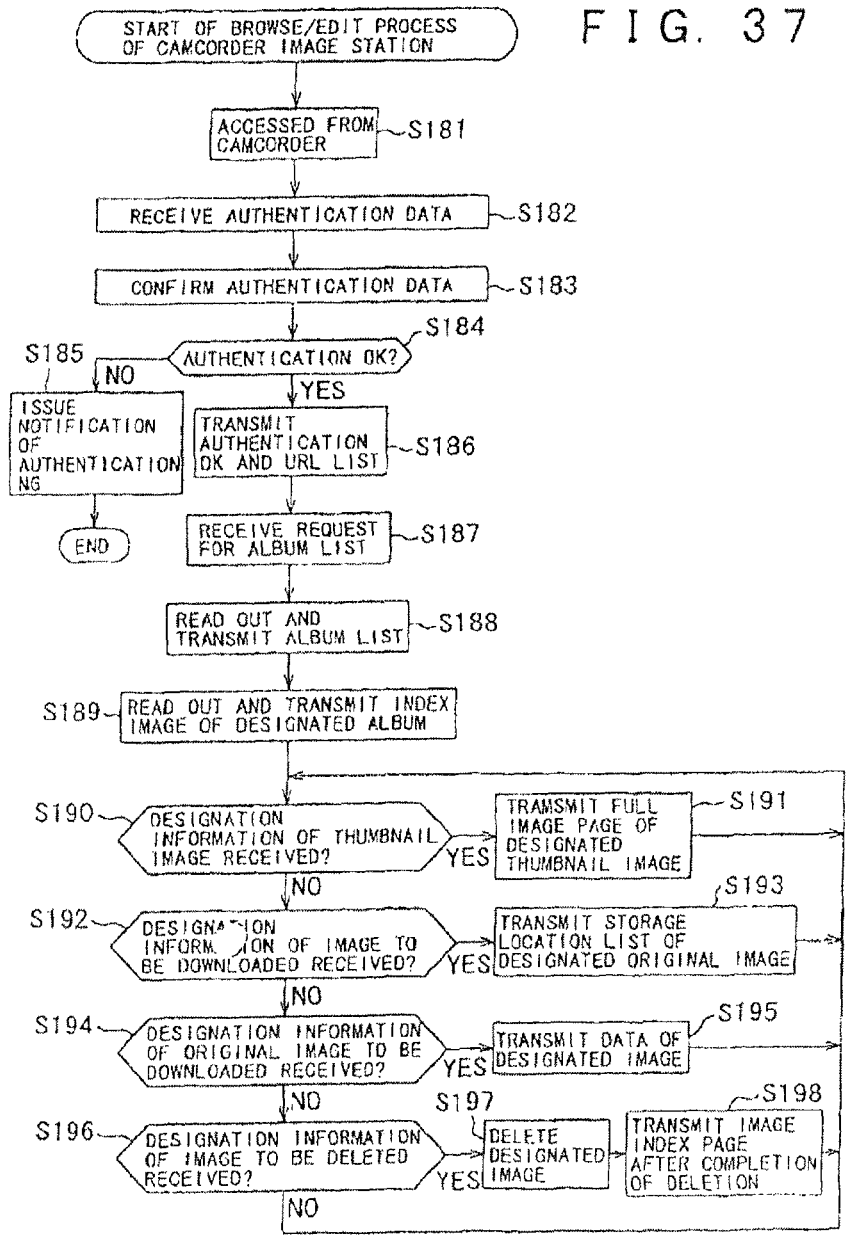

INFORMATION PROCESSING SYSTEM, INFORMATION PROCESSING APPARATUS, AND METHOD

This is a division of application Ser. No. 12/640,659, filed Dec. 17, 2009, which is a continuation of application Ser. No. 10/381,231, filed Mar. 21, 2003, now U.S. Patent No. 7,664,342 issued on Feb. 16, 2010, which is based on International Application PCT/JP2002/007406, filed Jul. 23, 2002 pursuant to 35 USC 371, which is entitled to the priority filing date of Japanese Application No. 2001-221207, filed on Jul. 23, 2001, the entirety of which is incorporated herein by reference.

TECHNICAL FIELD

The present invention relates to an information processing system, an information processing apparatus and method, and more particularly to an information processing system, an information processing apparatus and method by which user information can be transmitted rapidly and efficiently through a network.

BACKGROUND ART

A system is operating wherein images picked up by a video camera are registered into a server through the Internet such that they can be suitably read out and utilized when necessary.

In the system mentioned, an image picked up by a user using a video camera is registered into a server, for example, through such a process as illustrated in flow charts of FIGS. 1 and 2.

In particular, first at step S1, the user will access the server, for example, from a personal computer through the Internet. Then at step S2, the personal computer uploads image data into an in-box prepared by the server in advance for registering image data of users.

At step S3, the personal computer acquires, in response to an input from the user, the name of an album into which the image data uploaded by the process at step S2, and transmits the name of the album to the server. At step S4, the personal computer acquires information which designates an image to be moved to the album designated by the process at step S3 from the in-box uploaded by the process at step S2 in response to an input from the user, and transmits the acquired information to the server.

The server executes such a process as illustrated in the flow chart of FIG. 2 in accordance with such a process of the personal computer as described above.

When the server is accessed from the personal computer at step S11, it records, at step S12, the image data transferred thereto from the personal computer through the Internet by the process at step S2 into an in-box built therein.

When the album name is transmitted from the personal computer by the process at step S3, the server receives the album name and produces an album of the designated name at step S13. At step S14, the server executes a process of extracting the image designated from the personal computer by the process at step S4 from the image data recorded into the in-box by the process at step S12 and moving the extracted image into the album produced by the process at step S13.

As such processes are executed repetitively, images designated by the user are recorded into the album of the name designated by the user.

In the conventional system, after image data are recorded once into the in-box of the server, an album name is inputted from the personal computer such that an album of the name is produced by the server side, and the image data of the in-box are transferred to and recorded into the album. Accordingly, for example, in such a case that it is tried to register image data from a terminal apparatus of the portable type such as a video tape recorder integrated with a camera or a digital still camera, since such a terminal apparatus of the portable type as just mentioned normally includes no keyboard or the like, it is difficult to input characters rapidly. Therefore, the conventional system has a subject in that it is poor in operability.

The conventional system has another subject in that also the period of time within which a connection to the server remains established is long and a high communication cost is required.

DISCLOSURE OF INVENTION

The present invention has been made in view of such a situation as described above and makes it possible to register information simply and rapidly.

An information processing system of the present invention is characterized in that a first one of information processing apparatus holds a predetermined number of folders of names determined in advance in a corresponding relationship to each user to hold information of the users, and a second one of the information processing apparatus possessed by one of the users designates one of the folders of a predetermined name possessed by the first information processing apparatus and transmits the information to the designated folder through a network so as to be held by the designated folder.

The information may be image data.

The second information processing apparatus may be a video camera.

A first information processing apparatus of the present invention is characterized in that it comprises holding means for holding a predetermined number of folders of names determined in advance in a corresponding relationship to each user to hold user information of the users of different information processing apparatus, reception means for receiving the user information and designation information, which designates one of the folders into which the user information should be stored, transmitted from any of the different information processing apparatus through a network, and storage means for storing the user information received by the reception means into the folder of the name designated by the designation information.

The user information may be image data fetched by the different information processing apparatus.

The different information processing apparatus may be a video camera.

A first information processing method of the present invention is characterized in that it comprises a holding step of holding a predetermined number of folders of names determined in advance in a corresponding relationship to each user to hold user information of the users of different information processing apparatus, a reception step of receiving the user information and designation information, which designates one of the folders into which the user information should be stored, transmitted from any of the different information processing apparatus through a network, and a storage step of storing the user information received by the process of the reception step into the folder of the name designated by the designation information.

A first recording medium of the present invention is characterized in that a program thereon comprises a holding step of holding a predetermined number of folders of names determined in advance in a corresponding relationship to each user to hold user information of the users of different information processing apparatus, a reception step of receiving the user information and designation information, which designates one of the folders into which the user information should be stored, transmitted from any of the different information processing apparatus through a network, and a storage step of storing the user information received by the process of the reception step into the folder of the name designated by the designation information.

A first program of the present invention causes a computer to execute a holding step of holding a predetermined number of folders of names determined in advance in a corresponding relationship to each user to hold user information of the users of different information processing apparatus, a reception step of receiving the user information and designation information, which designates one of the folders into which the user information should be stored, transmitted from any of the different information processing apparatus through a network, and a storage step of storing the user information received by the process of the reception step into the folder of the name designated by the designation information.

A second information processing apparatus of the present invention is characterized in that it comprises holding means for holding a list of a predetermined number of folders of predetermined names in a corresponding relationship to a user in order that a different information processing apparatus may hold user information, designation means for designating a predetermined folder from within the list held by the holding means, and transmission means for transmitting designation information which designates the folder designated by the designation means and the user information to be stored into the folder designated by the designation means to the different information processing apparatus through a network.

The user information may be image data fetched by the information processing apparatus.

The information processing apparatus may be a video camera.

A second information processing method of the present invention is characterized in that it comprises a holding step of holding a list of a predetermined number of folders of predetermined names in a corresponding relationship to a user in order that a different information processing apparatus may hold user information, a designation step of designating a predetermined folder from within the list held by the process of the holding step, and a transmission step of transmitting designation information which designates the folder designated by the process of the designation step and the user information to be stored into the folder designated by the process of the designation step to the different information processing apparatus through a network.

A second recording medium of the present invention is characterized in that a program thereon comprises a holding step of holding a list of a predetermined number of folders of predetermined names in a corresponding relationship to a user in order that a different information processing apparatus may hold user information, a designation step of designating a predetermined folder from within the list held by the process of the holding step, and a transmission step of transmitting designation information which designates the folder designated by the process of the designation step and the user information to be stored into the folder designated by the process of the designation step to the different information processing apparatus through a network.

A second program of the present invention causes a computer to execute a holding step of holding a list of a predetermined number of folders of predetermined names in a corresponding relationship to a user in order that a different information processing apparatus may hold user information, a designation step of designating a predetermined folder from within the list held by the process of the holding step, and a transmission step of transmitting designation information which designates the folder designated by the process of the designation step and the user information to be stored into the folder designated by the process of the designation step to the different information processing apparatus through a network.

With the information processing system of the present invention, the first information processing apparatus holds a predetermined number of folders of names determined in advance in a corresponding relationship to each user, and the second information processing apparatus possessed by each user designates a folder of a predetermined name and transmits information to the folder so as to be held.

With the first information processing apparatus and method, recording medium and program of the present invention, a predetermined number of folders of names determined in advance are held in a corresponding relationship to a user, and user information transmitted from a different information processing apparatus is stored into a folder designated from the different information processing apparatus.

With the second information processing apparatus and method, recording medium and program of the present invention, a list of folders is held, and if a predetermined folder is designated from within the held list, then designation information of designating the folder and user information stored in the folder are transmitted to the different information processing apparatus.

BRIEF DESCRIPTION OF DRAWINGS

FIG. 2 is a flow chart illustrating an album production process of a conventional server;

FIG. 3 is a view showing a configuration of a service providing system to which the present invention is applied;

FIG. 4 is a block diagram showing a configuration of a camcorder of FIG. 3;

FIG. 5 is a block diagram showing a configuration of a customer registration web server of FIG. 3;

FIG. 30 is a view showing an example of display at step S150 of FIG. 27;

FIG. 36 is a view showing another example of display at step S117 of FIG. 23; and FIG. 37 is a flow chart illustrating a browse/edit process of the camcorder image station of FIG. 3.

BEST MODE FOR CARRYING OUT THE INVENTION

Figure 1:
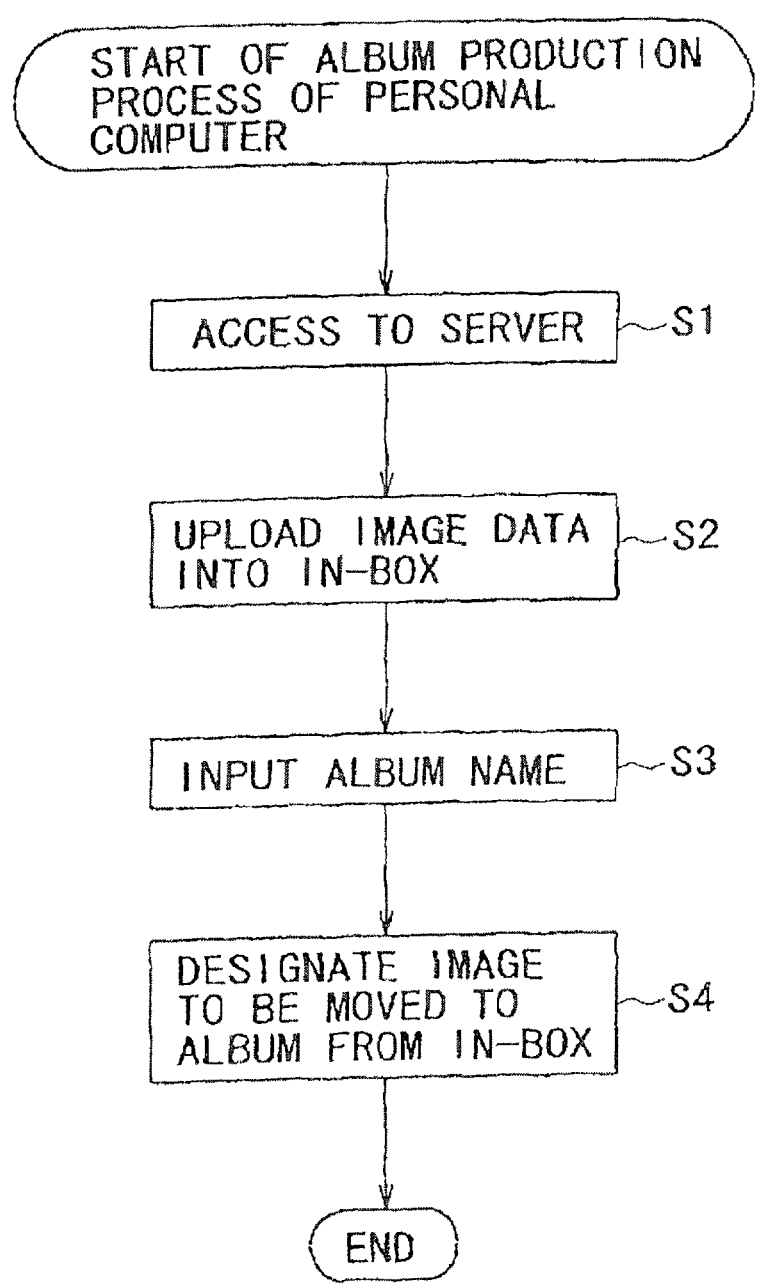
FIG. 1 is a flow chart illustrating an album production process of a conventional personal computer.

FIG. 3 shows an example of a configuration of a service providing system to which the present invention is applied. In the present service providing system, a network system 14, a network service business center 15, an image station server 16, an Internet service provider A (ISP-A) 17, an Internet service provider B (ISP-B) 18, an information providing server 19 and a search server 20 are connected to the Internet 10.

The network system 14, Internet service provider A 17 and Internet service provider B 18 are connected to a public network 13, and also a Bluetooth adapter 12 is connected to the public network 13. A camcorder 11 can establish a connection to the Bluetooth adapter 12 through short range radio communication based on the Bluetooth (trademark) and further establish a connection from the Bluetooth adapter 12 to the network system 14, Internet service provider A 17 or Internet service provider B 18 through the public network 13.

The network system 14 is composed of an access point (AP) 31, a customer database (C-DB) 32, a customer registration web server 33 and a registration authentication platform (RAP) 34.

The access point 31 is connected to the public network 13. The customer database 32 registers various kinds of information of a user who has purchased the camcorder 11. The customer registration web server 33 controls the registration process of the camcorder 11. The registration authentication platform 34 executes an authentication process of a user of the network system 14.

While the access point 31, customer database 32, customer registration web server 33 and registration authentication platform 34 are formed separately from one another in the example of FIG. 3, they may be otherwise be formed integrally with one another.

The network service business center 15 has a camcorder image station 41. The camcorder image station 41 registers and manages image data transmitted thereto from the camcorder 11.

The image station server 16 registers and manages image data transmitted thereto from a personal computer not shown.

The Internet service provider A 17 includes an access point 51, a customer database 52 and a mail server 53. The mail server 53 further includes a POP server 54 and an SMTP (Simple Mail Transfer Protocol) server 55.

The Internet service provider A 17 is a particular Internet service provider and is an Internet connection service provided by a company same as the provider of the service providing system shown in FIG. 2 or a cooperating enterprise or the like.

The access point 51 performs a communication process with the public network 13. The customer database 52 registers various kinds of information of users of the Internet service provider A 17. The POP server 54 principally manages a process of transmission and reception of mails to and from the camcorder 11. The SMTP server 55 principally manages transmission and reception of mails to and from another SMTP server (in the case of the present example, an SMTP server 65 of the Internet service provider B 18).

The Internet service provider B 18 has an access point 61 and a customer database 62 and further has a mail server 63 which includes a POP server 64 and the SMTP server 65. The basic configuration is similar to that of the Internet service provider A 17.

The information providing server 19 provides various kinds of information regarding, for example, products of a predetermined company. The search server 20 provides a service of searching various kinds of information laid open through the Internet 10.

FIG. 4 shows an example of a configuration of the camcorder 11. The camcorder 11 is a video tape recorder integrated with a camera and has an accessing function to the Internet 10. Referring to FIG. 4, a CPU (Central Processing Unit) 71 executes various processes in accordance with a program stored in a ROM (Read Only Memory) 72 or a program loaded in a RAM (Random Access Memory) 73. Also data necessary for the CPU 71 to execute various processes and so forth are suitably stored into the RAM 73. An EEPROM (Electrically Erasable Programmable Read Only Memory) 74 stores data which need be kept stored also after the power supply is disconnected.

The CPU 71, ROM 72, RAM 73 and EEPROM 74 are interconnected by a bus 75. Also an input/output interface 76 is connected to the bus 75.

An inputting section 77 including various buttons, switches and so forth, an LCD (Liquid Crystal Display) unit 78, a speaker 79, an image pickup section 80 formed from a CCD (Charge Coupled Device) image pickup device or the like, a microphone 81 for fetching a sound signal and a communication section 82 for performing short range radio communication with the Bluetooth adapter 12 based on the Bluetooth are connected to the input/output interface 76.

A recording and reproduction section 83 records image data picked up by the image pickup section 80, sound data collected by the microphone 81 and so forth onto a cassette magnetic tape loaded therein. Further, the recording and reproduction section 83 reproduces image data and sound data recorded on a cassette magnetic tape, outputs an image corresponding to the image data to the LCD unit 78 to display the same, and supplies sound data to the speaker 79 so that the sound data are outputted.

A memory card interface 84 executes, when a memory card 85 as a portable semiconductor memory is loaded therein, a writing process and a reading out process of data into and from the memory card 85. The memory card 85 can store image data picked up by the image pickup section 80 and sound data collected by the microphone 81 as well as various data acquired from the communication section 82 through the Internet 10.

An encoder/decoder 86 encodes or decodes image data in accordance with the MPEG (Moving Picture Experts Group) or JPEG (Joint Photographic Coding Experts Group) system.

When necessary, a drive 87 is connected to the input/output interface 76, and a magnetic disk 91, an optical disk 92, a magneto-optical disk 93, a semiconductor memory 94 or the like is suitably loaded into the drive 87 such that a computer program read out from the thus loaded medium is installed into the RAM 73 when necessary.

FIG. 5 shows an example of a configuration of the customer registration web server 33. Referring to FIG. 5, a CPU 111 executes various processes in accordance with a program stored in a ROM 112 or another program loaded from a storage section 118 into a RAM 113. Also data necessary for the CPU 111 to execute various processes and so forth are suitably stored into the RAM 113.

The CPU 111, ROM 112 and RAM 113 are interconnected by a bus 114. Also an input/output interface 115 is connected to the bus 114.

An inputting section 116 including a keyboard, a mouse and so forth, an outputting section 117 including a display unit formed from a CRT or an LCD unit and a speaker or the like, the storage section 118 formed from a hard disk or the like, and a communication section 119 including a modem, a terminal adapter and so forth are connected to the input/output interface 115. The communication section 119 performs a communication process through a network including the Internet 10.

When necessary, also a drive 120 is connected to the input/output interface 115, and a magnetic disk 131, an optical disk 132, a magneto-optical disk 133, a semiconductor memory 134 or the like is suitably loaded into the drive 120 such that a computer program read out from the thus load medium is installed into the storage section 118 when necessary.

Where the access point 31, customer database 32 and registration authentication platform 34 are formed separately from the customer registration web server 33, though not shown, they are formed in a basically similar configuration to that of the customer registration web server 33.

Figure 6:
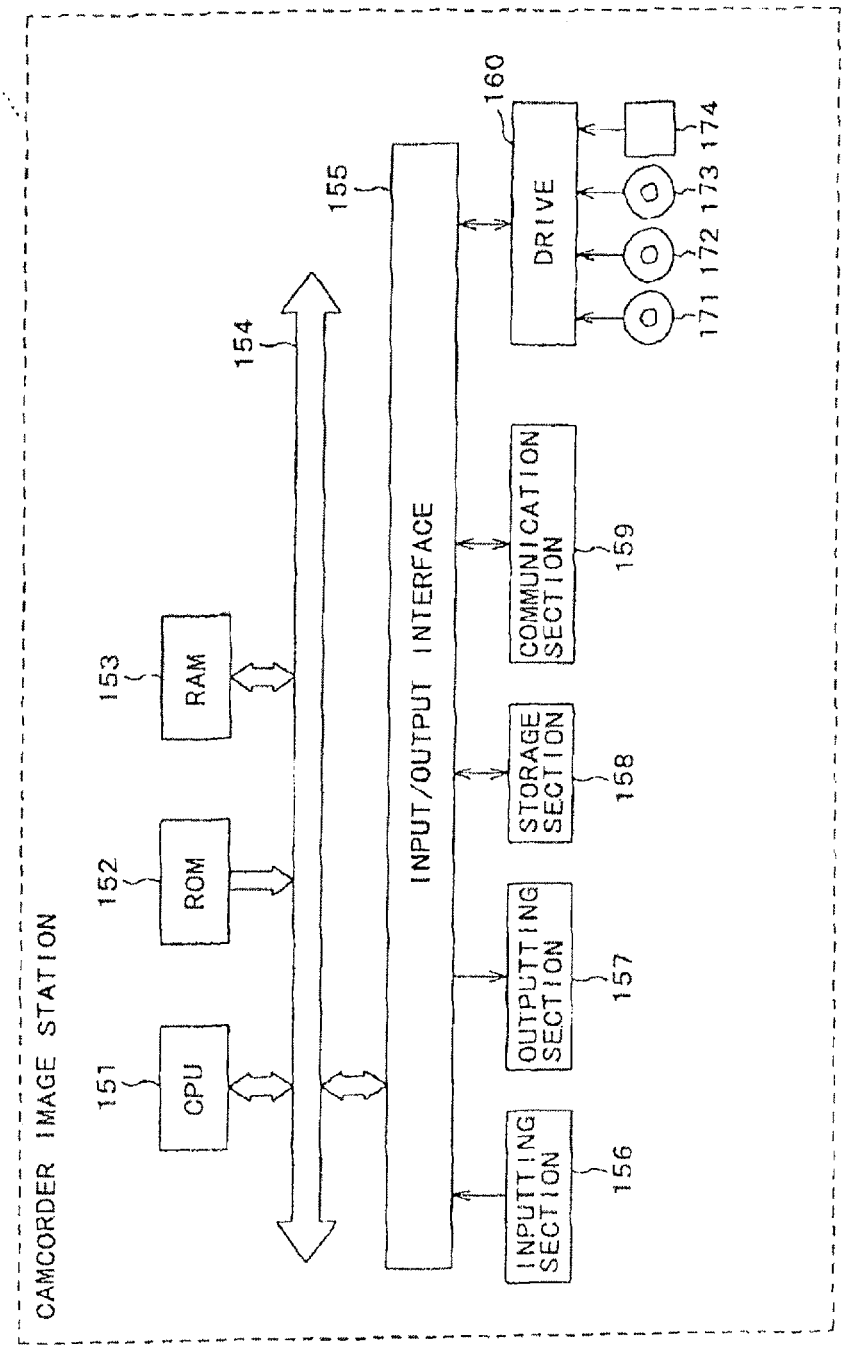
FIG. 6 is a block diagram showing a configuration of a camcorder image station of FIG. 3.

FIG. 6 shows an example of a configuration of the camcorder image station 41 which composes the network service business center 15. The components of the camcorder image station 41 from a CPU 151 to a semiconductor memory 174 have basically similar configurations to those of the components of the customer registration web server 33 of FIG. 5 from the CPU 111 to the semiconductor memory 134, and those components having like names have like functions. Accordingly, description of them is omitted herein to avoid redundancy.

Figure 7:
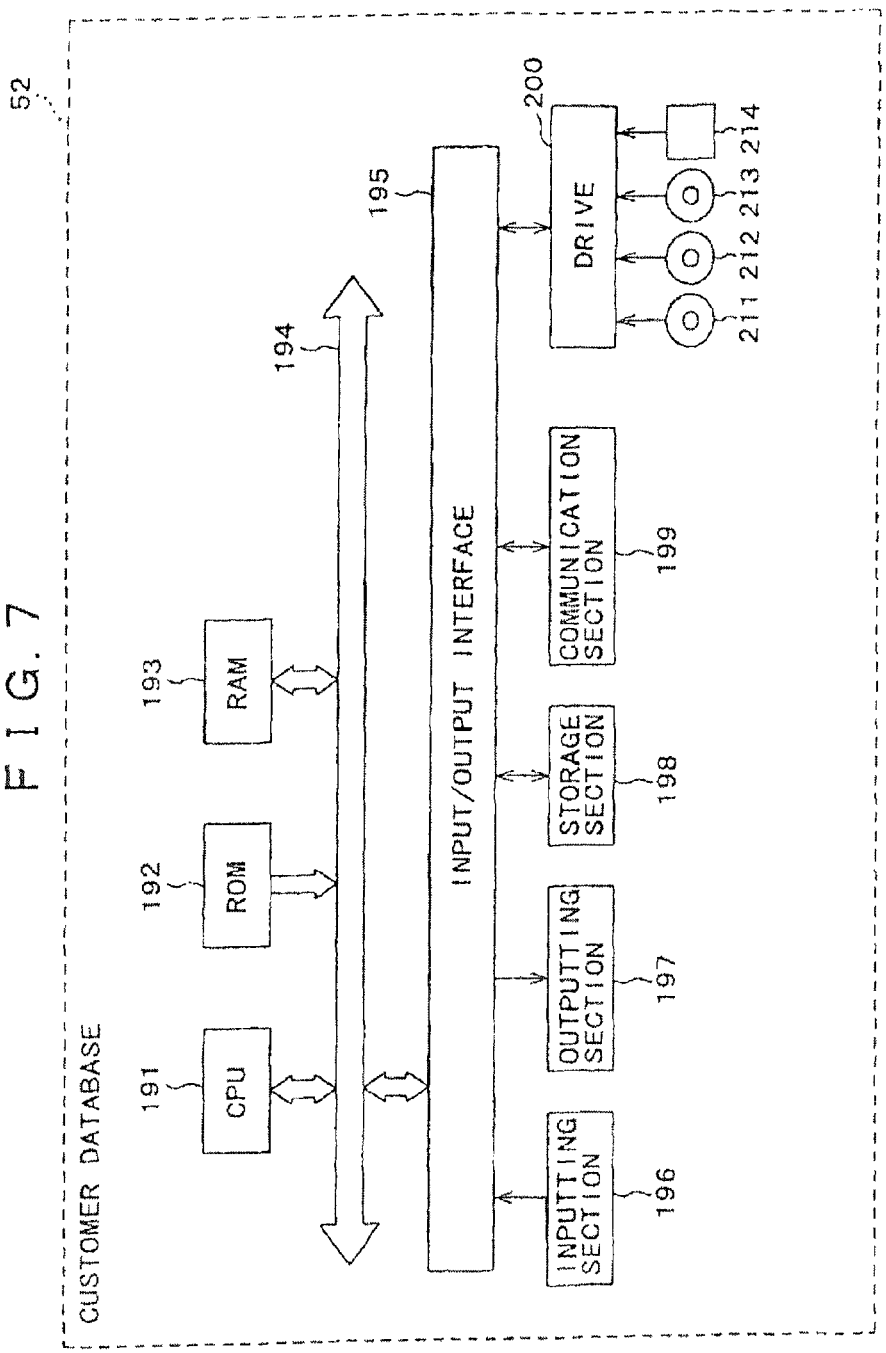
FIG. 7 is a block diagram showing a configuration of a customer database of FIG. 3.

FIG. 7 shows an example of a configuration of the customer database 52 of the Internet service provider A 17. Also components of the customer database 52 from a CPU 191 to a semiconductor memory 214 have basically similar configurations to those of the components of the customer registration web server 33 of FIG. 5 from the CPU 111 to the semiconductor memory 134, and those components having like names have like functions. Accordingly, description of them is omitted herein to avoid redundancy.

Where the access point 51 and the mail server 53 (POP server 54 and SMTP server 55) are formed separately from the customer database 52, also they basically have a configuration similar to that of the customer database 52 of FIG. 7.

If the user operates the inputting section 77 to set a memory mode and performs image pickup, then an image picked up by the image pickup section 80 is encoded by the encoder/decoder 86 and recorded into the memory card 85 through the memory card I/F 84. If image pickup is performed in a camera mode, then image data are recorded into a cassette magnetic tape by the recording and reproduction section 83.

An image picked up by the camcorder 11 and recorded in the memory card 85 can be transferred to and registered into the camcorder image station 41 of the network service business center 15 through the Internet 10. In the following, this process is described. It is to be noted that, to perform this process, it is necessary for the user of the camcorder 11 to register user information into the custom database 32 of the network system 14 in advance and receive allocation of an ID and a password, and store them into the EEPROM 74. The user having received allocation of an ID and a password from the network system 14 can utilize the same ID and password to utilize services of the Internet service provider A 17 and the network service business center 15.

Figure 8:
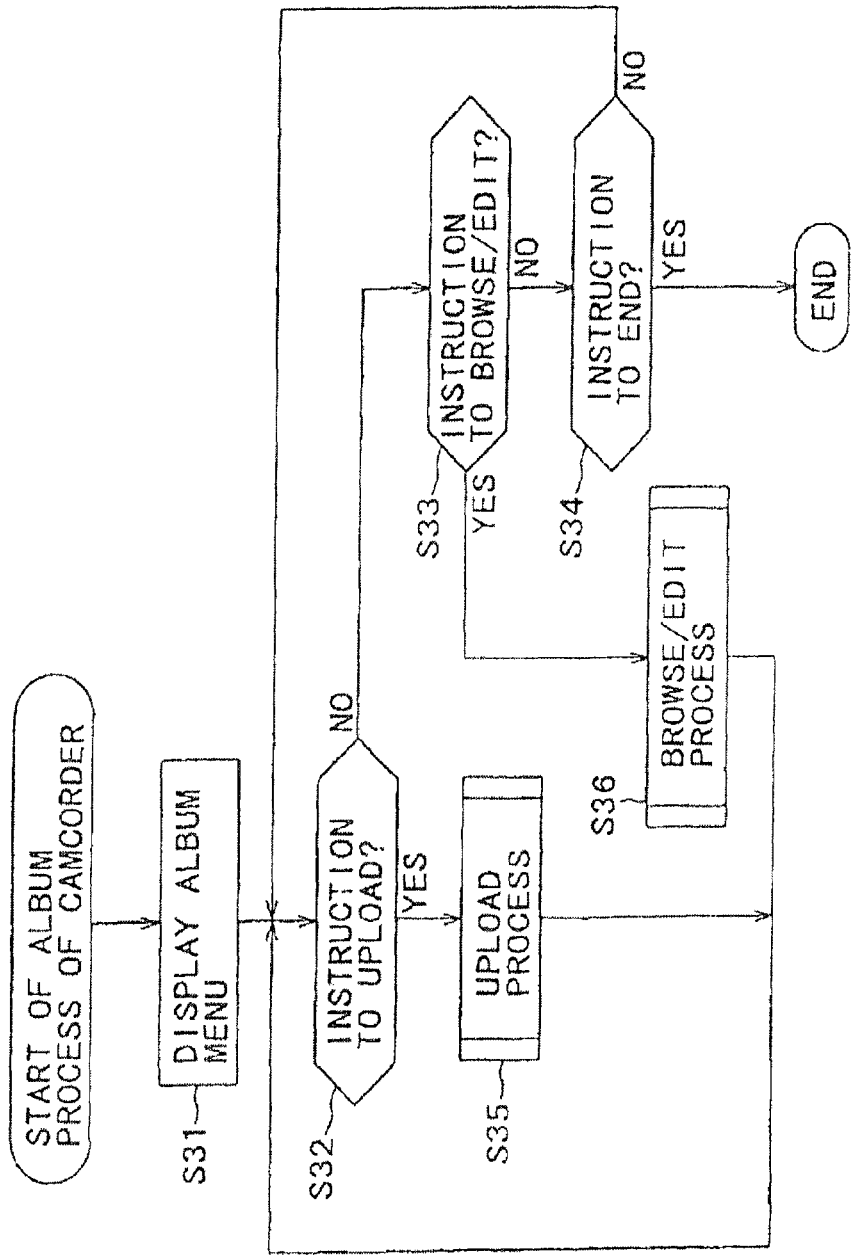
FIG. 8 is a flow chart illustrating an album process of the camcorder of FIG. 3.

FIG. 8 illustrates an album process which is a process regarding a service which can be enjoyed when the camcorder 11 accesses the network service business center 15.

Figure 9:
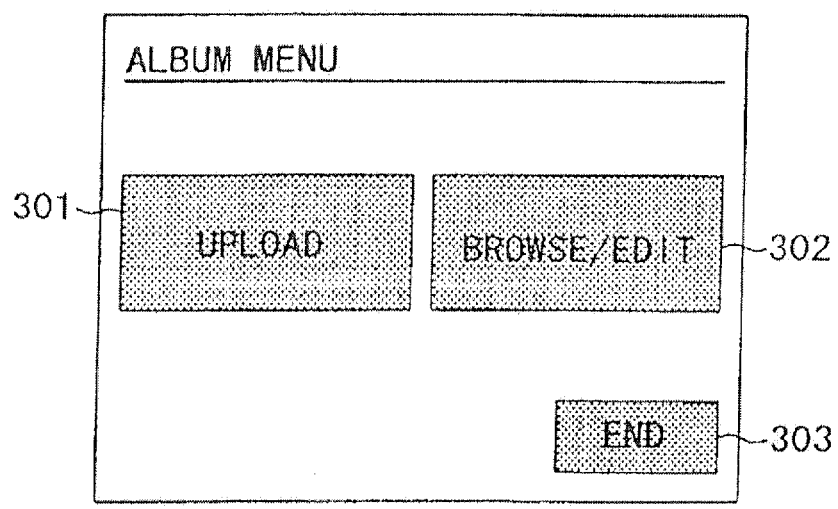
FIG. 9 is a view showing an example of display at step S31 of FIG. 8.

If the user operates the inputting section 77 to issue an instruction to access the camcorder image station 41 of the network service business center 15, then the CPU 71 reads out image data of an album menu stored in advance in the ROM 72 and outputs the image data to the LCD 78 so as to be displayed at step S31. Consequently, for example, such an album menu as shown in FIG. 9 is displayed.

In the album menu, an upload button 301 which is operated by the user to transfer image data to the camcorder image station 41, a browse/edit button 302 which is operated to access or edit image data registered already in the camcorder image station 41, and an end button 303 which is operated to end the process. The user will operate one of the three buttons when necessary.

Thus, the CPU 71 discriminates at steps S32, S33 and S34 whether or not the upload button 301 is operated, whether or not the browse/edit button 302 is operated and whether or not the end button 303 is operated, respectively. If none of them is operated, then the CPU 71 waits until one of them is operated.

If it is discriminated at step S32 that the upload button 301 is operated, then the processing advances to step S35, at which the CPU 71 executes an upload process. Details of the upload process are hereinafter described with reference to a flow chart of FIG. 10.

If it is discriminated at step S33 that the browse/edit button 302 is operated, then the processing advances to step S36, at which the CPU 71 executes a browse/edit process. Details of the browse/edit process are hereinafter described with reference to flow charts of FIGS. 21 to 23.

If it is discriminated at step S34 that the end button 303 is operated, then the CPU 71 ends the album process.

Figure 10:
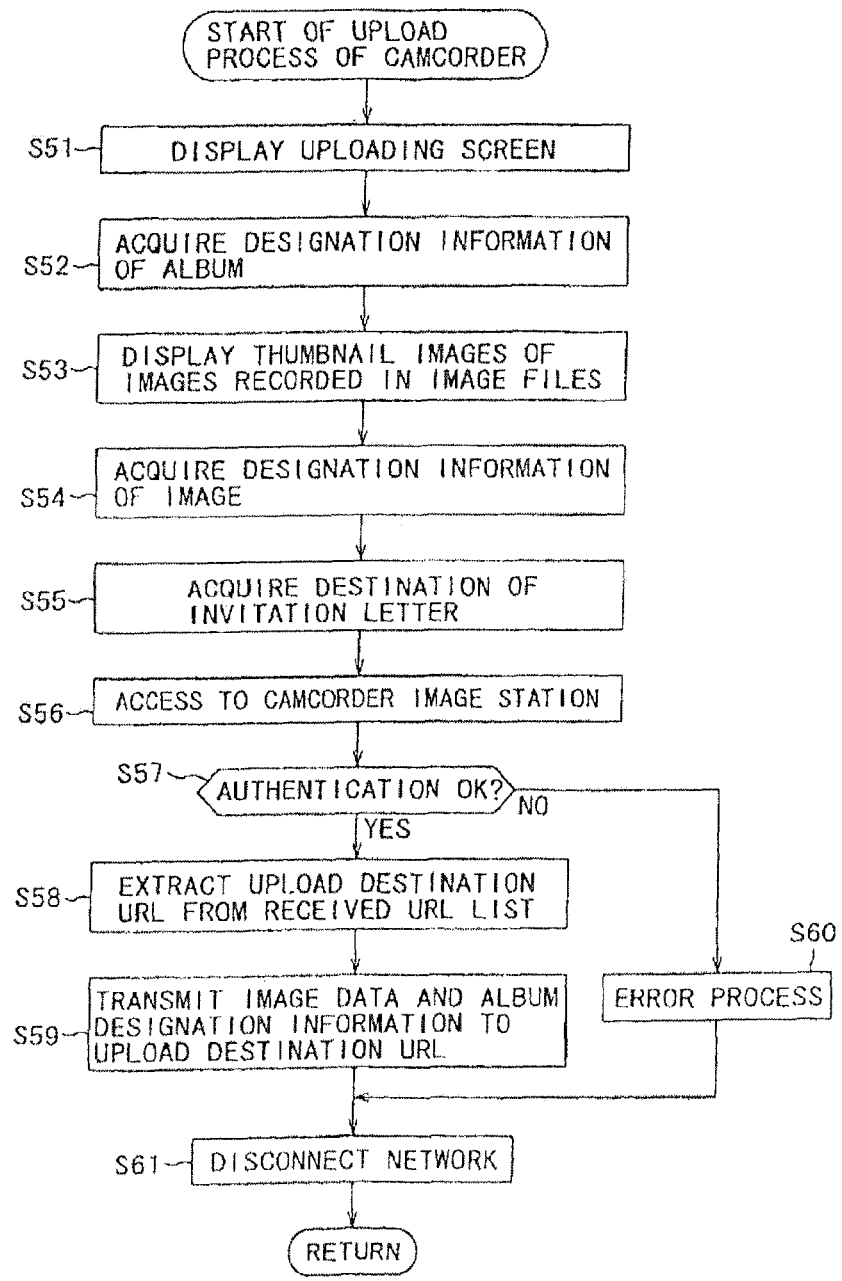
FIG. 10 is a flow chart illustrating details of an upload process at step S35 of FIG. 8.

Now, details of the upload process at step S35 of FIG. 8 are described with reference to a flow chart of FIG. 10.

Figure 11:
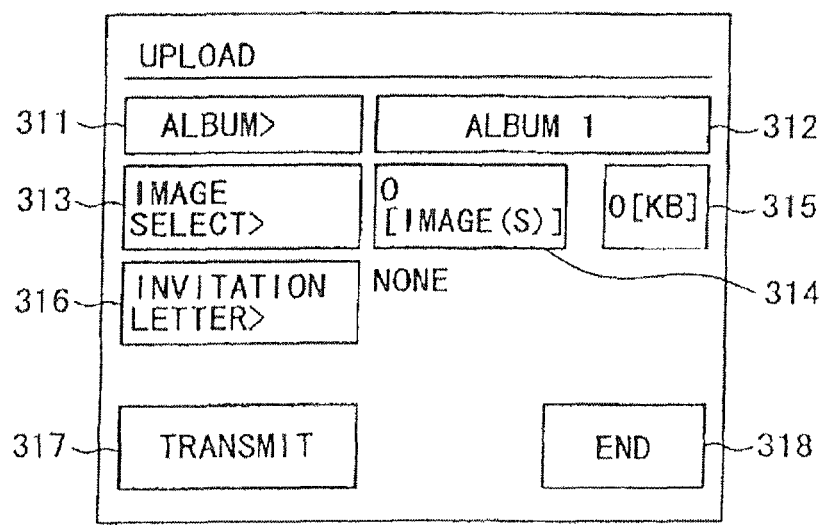
FIG. 11 is a view showing an example of display at step S51 of FIG. 10.

If the user operates the inputting section 77 to click the upload button 301, then the CPU 71 reads out data for an upload screen stored in advance in the ROM 72 and outputs the data to the LCD 78 so as to be displayed at step S51. FIG. 11 shows an example of display in this instance. In this example, an album button 311 which is operated to select a predetermined album from among a plurality of (in the present example, 10) albums is displayed. If the user operates the inputting section 77 to operate the album button 311, then the names of albums album 1, album 2, album 3 . . . , and album 10 are displayed in a pull-down form. Here, if the inputting section 77 is operated to move a focus and select an arbitrary album, then the name of the album is displayed in a display area 312.

An image select button 313 is operated to select an image to be uploaded. A display area 314 and another display area 315 are provided on the right side of the image select button 313. In the display area 314, the number of images selected till then is displayed. In the display area 315 on the right side, the total data amount of the number of images displayed in the display area 314 is displayed in a unit of kilobytes.

An invitation letter button 316 is operated to send a mail (an invitation letter) for requesting a friend to watch an uploaded image to the friend in order that the friend or the like may watch the uploaded image.

A transmit button 317 is operated to transmit and register selected images (the number of images having the data amount displayed in the display areas 314 and 315 to and into the album of the selected name (album displayed in the display area 312). An end button 318 is operated to end the upload process.

At step S52, the CPU 71 acquires album designation information. In particular, when the user operates the album button 311 to display an album of a predetermined name in the display area 312 as described above, the CPU 71 acquires information which specifies the displayed album. In the case of the example of FIG. 11, since "album 1" is selected, information which specifies this "album 1" is acquired.

If the image select button 313 is operated, then the CPU 71 produces a thumbnail image of each of images (still pictures) stored in the image file stored in the memory card 85 and outputs the thumb nail images to the LCD 78 so as to be displayed at step S53.

Figure 12:
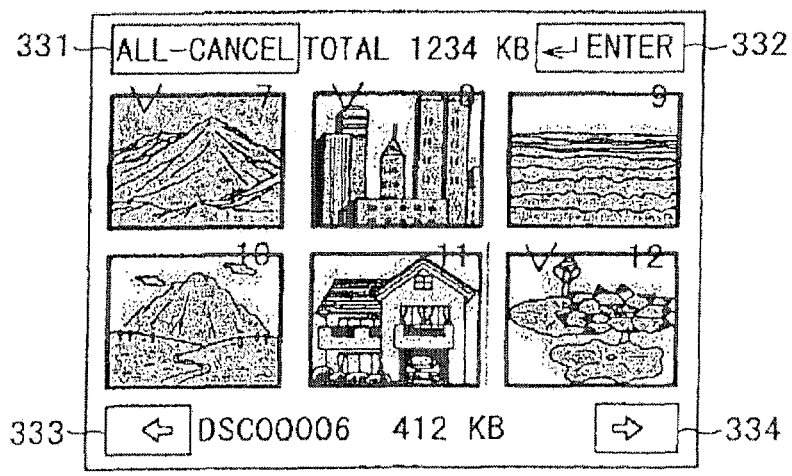
FIG. 12 is a view showing an example of display at step S53 of FIG. 10.

FIG. 12 shows an example of display of thumbnail images in such an instance as just described. The user can designate a predetermined one of the displayed thumbnail images as an image to be uploaded. When a predetermined thumbnail image is designated, the CPU 71 causes a check mark to be displayed at a left upper location of the thumbnail image. In the example of FIG. 12, three thumbnail images having the numbers 7, 8 and 12 are selected as images to be uploaded.

A button 333 is operated to change the thumbnail images to be displayed to those of lower numbers. On the contrary, another button 334 is operated to change the thumbnail images to be displayed to those of higher numbers.

An all-cancel button 331 is operated to cancel all checks displayed on the screen to restore the upload screen (FIG. 11). An enter button 332 is operated to decide a selection with regard to the displayed thumbnail images.

At step S54, the CPU 71 acquires, when the enter button 332 is operated while predetermined thumbnail images are selected as shown in FIG. 12, designation information which designates (specifies) the images corresponding to the selected thumbnail images.

Figure 13:
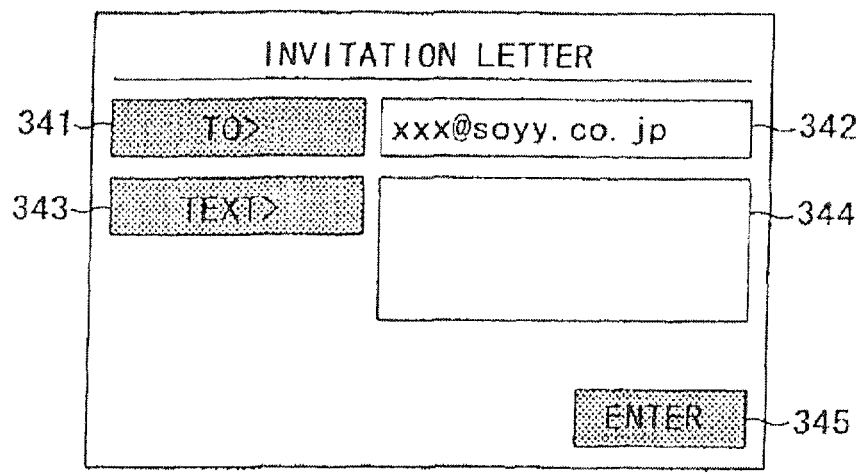
FIG. 13 is a view showing an example of display at step S55 of FIG. 10.

If the invitation letter button 316 shown in FIG. 11 is operated, then the CPU 71 reads out data of an invitation letter screen stored in the ROM 72 and outputs the data to the LCD 78 so as to be displayed at step S55. Consequently, for example, such an invitation letter screen as shown in FIG. 13 is displayed. In this example of display, an input display area 342 is provided on the right side of a destination button 341. If the user clicks the destination button 341, than a state is established wherein a mail address of a destination to which the invitation letter should be sent (the mail should be transmitted) can be inputted into the input display area 342. The user will operate the inputting section 77 to input a mail address of the other party to whom the invitation letter should be sent into the input display area 342.

If the user operates a text button 343, then a state is established wherein a text of a mail to be transmitted as the invitation letter can be inputted into an input display area 344 on the right side of the text button 343. The user will operate the inputting section 77 to input a text of a mail to be transmitted as the invitation letter into the input display area 344.

An enter button 345 is operated by the user when such inputting of the destination and the text of the invitation letter is completed. When the enter button 345 is operated, the CPU 71 acquires the destination data and the text data inputted to the input display areas 342 and 344.

The processes at steps S51 to S55 described above are executed off-line. Consequently, there is no necessity to keep the camcorder 11 connected to the camcorder image station 41 through the Internet 10 for a long period of time.

If the transmit button 317 shown in FIG. 11 is operated, then the CPU 71 executes a process of accessing the camcorder image station 41 at step S56. In particular, the CPU 71 reads out the network address stored in the ROM 72 and controls the communication section 82 to access the camcorder image station 41.

As a result, accessing to the camcorder image station 41 is carried out through the Bluetooth adapter 12, public network 13, Internet service provider A 17 and Internet 10. Then, the CPU 71 reads out the ID and the password recorded in the EEPROM 74 and transmits them to the camcorder image station 41.

It is to be noted that, more particularly, before a connection to the camcorder image station 41 is established, to establish a connection to the Internet 10, an ID and a password are transmitted to the Internet service provider A 17, and after a correct authentication result is obtained, the ID and the password are transmitted to the camcorder image station 41.

Figure 14:
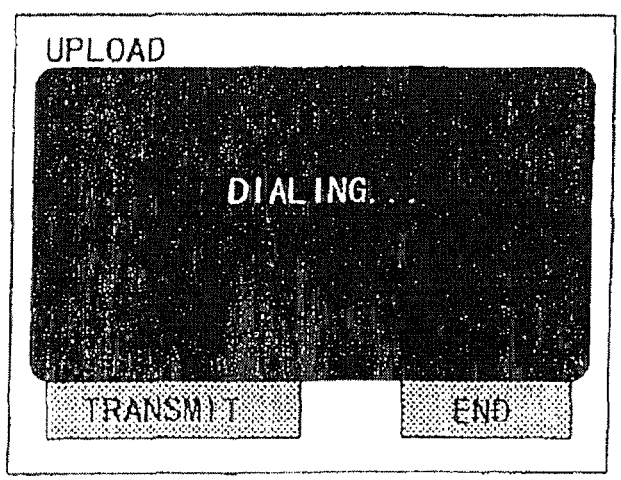
FIG. 14 is a view showing an example of display at step S56 of FIG. 10.
Figure 15:
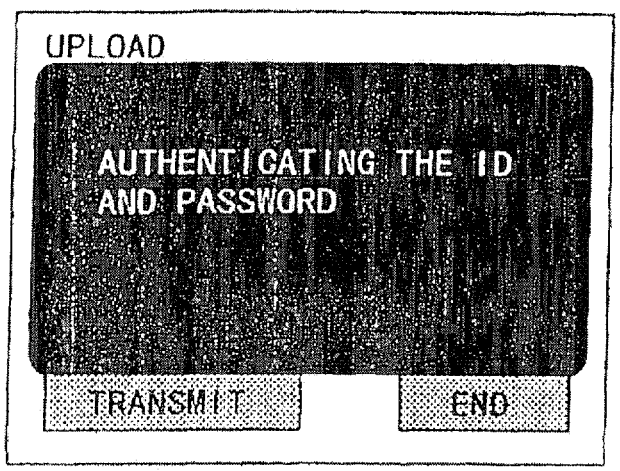
FIG. 15 is a view showing another example of display at step S56 of FIG. 10.

At this time, the CPU 71 reads out the image data stored in advance in the ROM 72 and outputs them to the LCD 78 so as to be displayed. Consequently, for example, an image of a message of "Dialing" as shown in FIG. 14 is displayed. Thereafter, for example, a message of "Authenticating the ID and password" as shown in FIG. 15 is further displayed.

When the camcorder image station 41 authenticates the ID and the password transmitted thereto from the camcorder 11 and it is authenticated that the user is a legal user, the result of the authentication is transmitted to the camcorder 11 through the Internet 10, Internet service-provider A 17, public network 13 and Bluetooth adapter 12.

The CPU 71 discriminates at step S57 whether or not a signal of authentication OK and an RUL of the upload destination (step S75 of FIG. 19 hereinafter described) are received from the camcorder image station 41. If they are received, then the processing advances to step S58, at which the CPU 71 extracts the URL of the upload destination from the received URL list. The processing further advances to step S59, at which the CPU 71 transmits image data to be uploaded and designation information for designating an album to the URL of the upload destination. The image data to be transmitted here are the image data designated by the process at step S54 (the image data corresponding to the thumbnails checked in the example of display of FIG. 12), and the designation of an album is the information for designating an album acquired by the process at step S52 (information for designating the album displayed in the display area 312 of FIG. 11).

Figure 16:
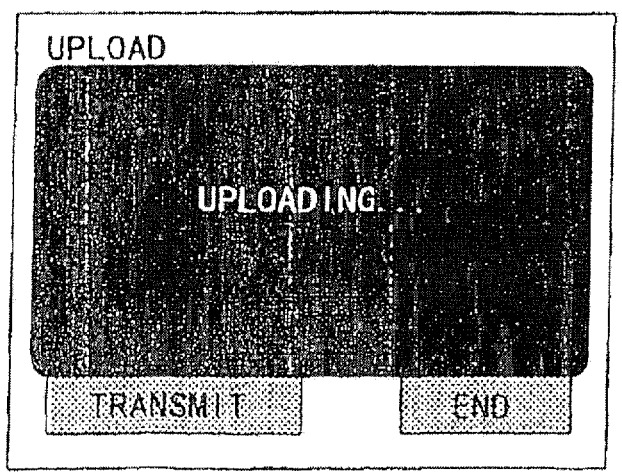
FIG. 16 is a view showing an example of display at step S59 of FIG. 10.
Figure 17:
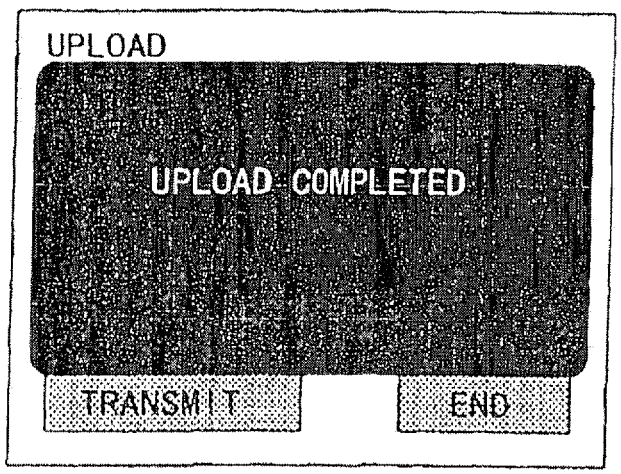
FIG. 17 is a view showing another example of display at step S59 of FIG. 10.

At step S59, the CPU 71 controls the LCD 78 to display, for example, such a message of "Uploading" as shown in FIG. 16 while the image data and the album designation information are being transmitted. Then, when all image data are transmitted and a notification of completion of the uploading is received from the camcorder image station 41, the CPU 71 controls the LCD 78 to display, for example, a message of "Upload completed" as shown in FIG. 17.

Figure 19:
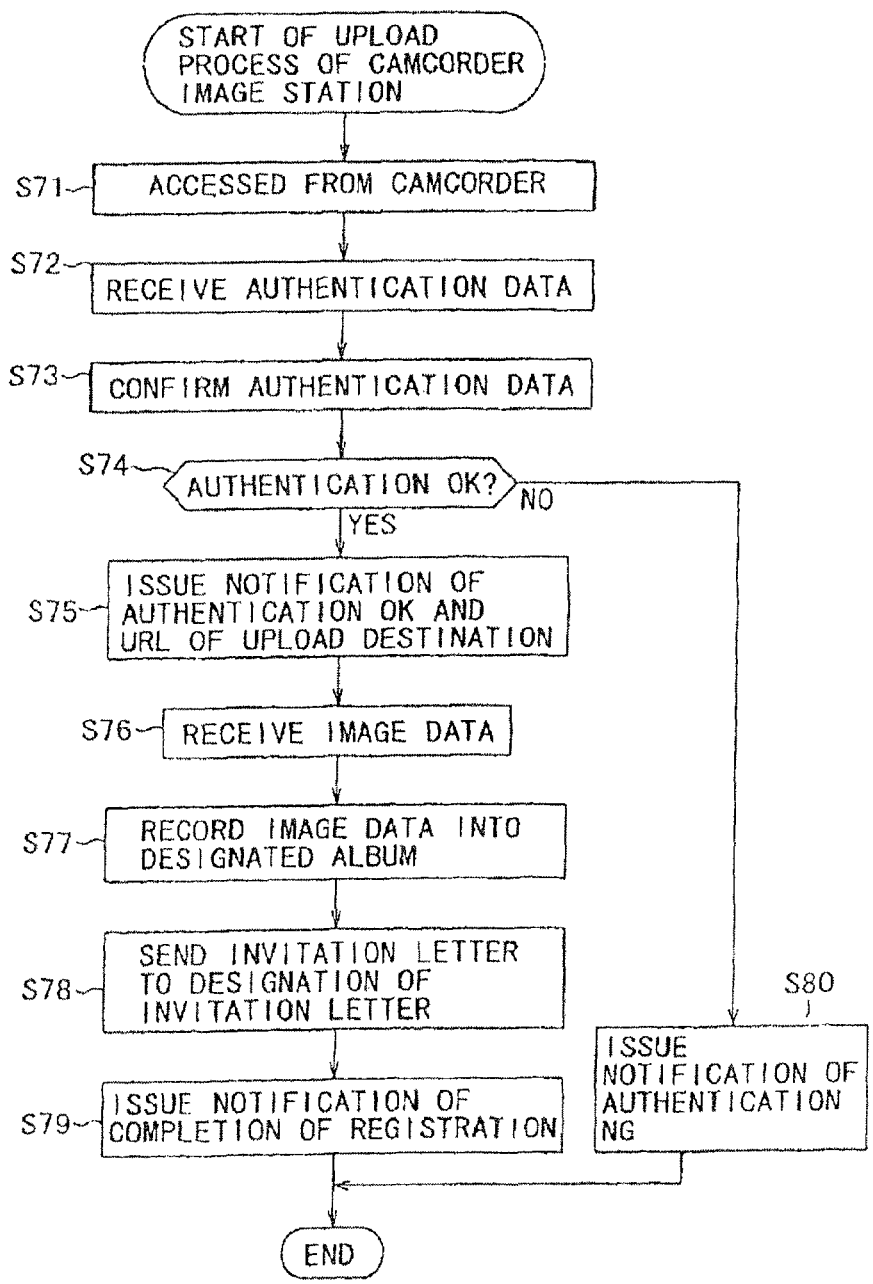
FIG. 19 is a flow chart illustrating an upload process of the camcorder image station of FIG. 3.

If it is discriminated at step S57 that a signal of authentication OK is not received from the camcorder image station 41 (if it is discriminated that a signal of authentication NG transmitted at step S80 of FIG. 19 is received), then since this signifies that the password and the ID are not correct, the processing in this instance advances to step S60, at which the CPU 71 executes an error process. In particular, in this instance, the user cannot upload the image data to the camcorder image station 41.

After the process at step S59 or at step S60, the processing advances to step S61, at which the CPU 71 executes a process of controlling the communication section 82 to disconnect the network.

Figure 18:
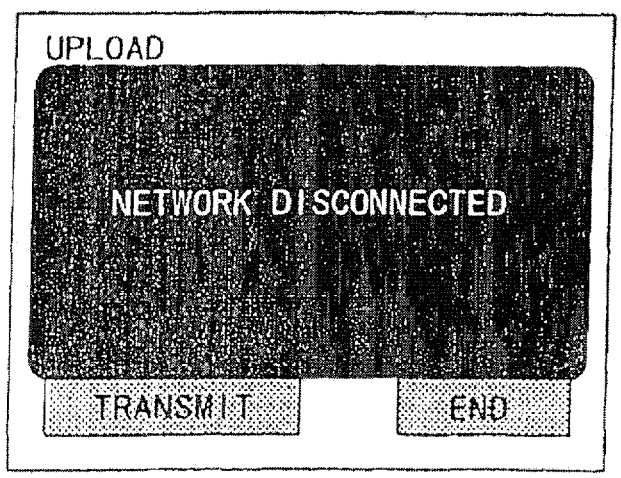
FIG. 18 is a view showing an example of display at step S61 of FIG. 10.

When the network is disconnected at step S61, the CPU 71 controls the LCD 78 to display, for example, a message of "Network disconnected" as shown in FIG. 18.

In this manner, the camcorder 11 is actually connected to the camcorder image station 41 only while it actually transmits image data, and therefore, the connection time can be reduced. As a result, in such a case that the charge for use of the network on the user depends upon the time of use, the charge for use can be reduced. Further, the traffic of the network can be reduced thereby to make it possible for a greater number of users to transfer image data efficiently.

Now, a process of the camcorder image station 41 executed in a corresponding relationship to the process of the camcorder 11 is described with reference to a flow chart of FIG. 19.

After the CPU 151 of the camcorder image station 41 is accessed from the camcorder 11 at step S71, it receives authentication data transmitted thereto from the camcorder 11 at step S72. The authentication data include an ID and a password.

When the CPU 151 receives the authentication data through the communication section 159, it confirms the authentication data based on the database stored in the storage section 158 at step S73. Then, the CPU 151 discriminates based on a result of the confirmation whether or not the authentication is OK at step S74. If the authentication is OK, then the processing advances to step S75, at which the CPU 151 transmits a signal of authentication OK and a URL of the upload destination. When the notification of the authentication OK is issued, the process at step S59 of FIG. 10 is executed by the camcorder 11 as described hereinabove, and image data and album designation information are transmitted from the camcorder 11.

Thus, the CPU 151 receives the image data and the designation information through the communication section 159 at step S76, and records the received image data into the album designated by the received designation information at step S77.

In particular, the camcorder image station 41 has a folder for each user in advance in the storage section 158 and includes 10 albums (from album 1 to album 10) in each folder, and records the received image data into the album of the designated name.

Figure 20:
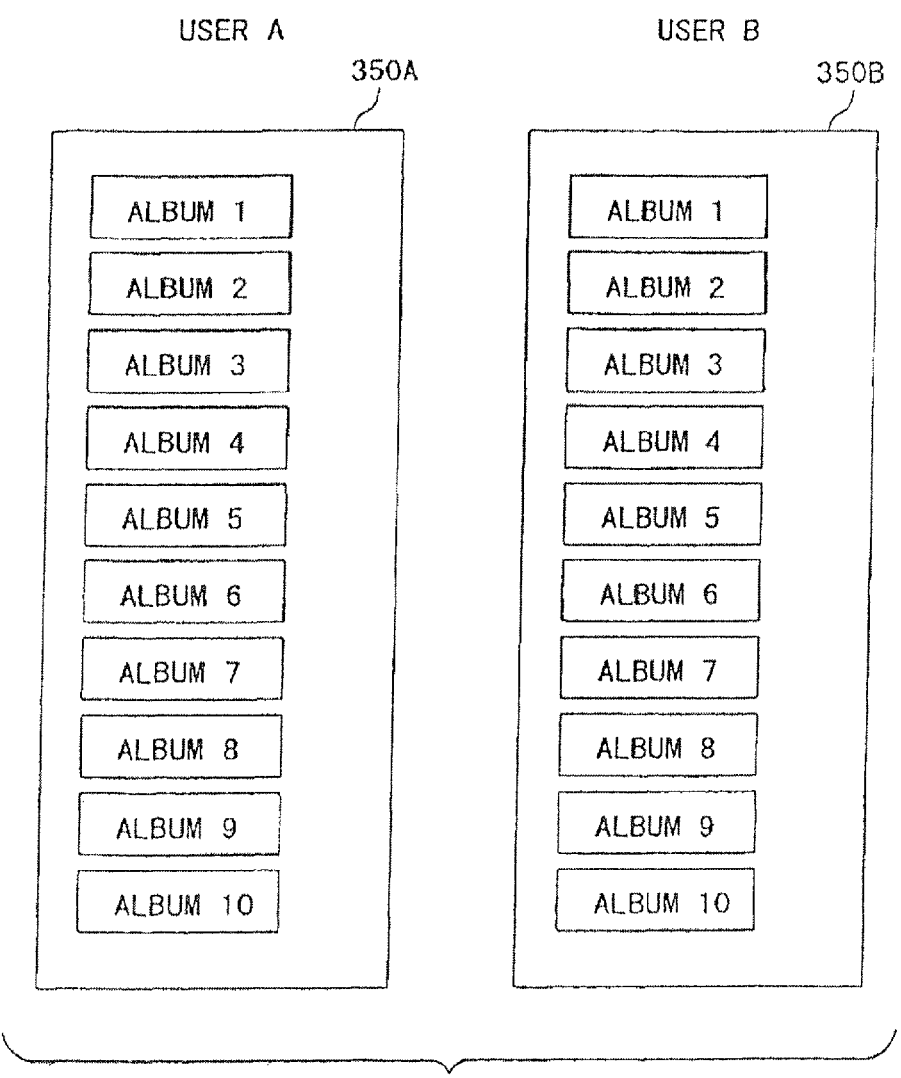
FIG. 20 is a view showing an example of recording at step S77 of FIG. 19.

FIG. 20 schematically illustrates an example of a configuration of a folder possessed by the camcorder image station 41. In the example of FIG. 20, a folder 350A of a user A and another folder 350B of another user B are shown. In each folder, 10 folders from album 1 to album 10 are formed as sub folders. The received data are recorded into one of the albums which has the name designated by the user.

In this manner, in the present system, since lists of albums are registered in advance in the camcorder 11 and actual albums corresponding to the lists are held in the camcorder image station 41, it is necessary for the user only to designate an album but not to input the name of the album, and the operability is improved.

Further, if the data received at step S76 include an invitation letter, then the CPU 151 of the camcorder image station 41 executes a process of sending the invitation letter to the destination at step S78.

When the registration is completed in such a manner as described above, the CPU 151 notifies the camcorder 11 of the completion of registration at step S79. As described above, when the notification is issued, the camcorder 11 causes a message of "Upload completed" to be displayed as shown in FIG. 17. Further, the camcorder 11 cuts the connection to the camcorder image station 41 (step S61 of FIG. 10).

If it is discriminated at step S74 that a result of authentication OK is not obtained, then the CPU 151 advances the processing to step S80, at which it notifies the camcorder 11 of an authentication NG signal. At this time, the camcorder 11 executes the error process at step S59 of FIG. 10 as described hereinabove.

Now, details of the browse/edit process at stop S36 of FIG. 8 by the camcorder 11 are described with reference to flow charts of FIGS. 21 to 23.

At step S91, when the browse/edit button 302 of FIG. 9 is operated by the user, the CPU 71 of the camcorder 11 controls the communication section 82 at step S91 to access the camcorder image station 41. Then, in this instance, the CPU 71 reads out the ID and the password stored in the EEPROM 74 and transmits them to the camcorder image station 41 in a similar manner as in the case described hereinabove. An authentication process is performed based on the ID and the password by the camcorder image station 41, and a signal representative of whether or not the authentication is OK is transmitted from the camcorder image station 41 to the camcorder 11.

Thus, at step S92, the CPU 71 discriminates whether or not an authentication OK signal is received from the camcorder image station 41. If no authentication OK signal is received (if an authentication NG signal is received), then the processing advances to step S93, at which the CPU 71 executes an error process. In particular, in this instance, the user of the camcorder 11 cannot execute a browse/edit process because the ID and the password are not correct.

If it is discriminated at step S92 that an authentication OK signal is received, then since a URL list is transmitted together with the authentication OK signal, the CPU 71 receives the URL list at step S94. The user selects a URL of an album list from within the URL list and issues an instruction for transmission of the album list. In response to the instruction, the CPU 71 issues a request for transmission of the album list to the camcorder image station 41 at step S95. In response to the request, the list of albums registered by the user is transmitted from the camcorder image station 41 as hereinafter described (step S188 of FIG. 37). Therefore, the CPU 71 receives the album list through the communication section 82 at step S96. Then at step S97, the CPU 71 stores the album list received at step S96 into the RAM 73 once and then outputs the album list to the LCD 78 so as to be displayed.

Figure 24:
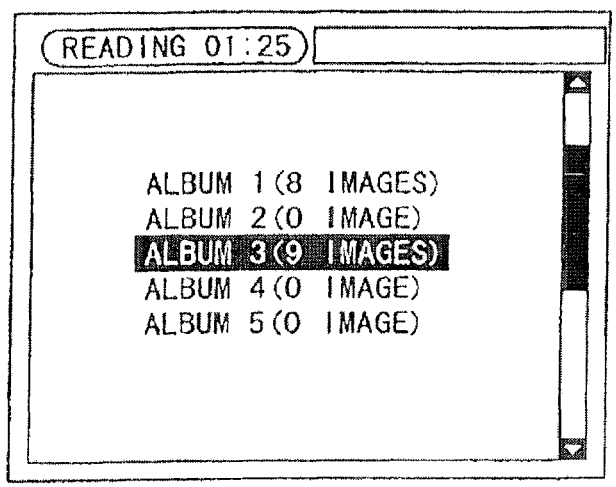
FIG. 24 is a view showing an example of display at step S97 of FIG. 21.

Consequently, for example, such an album list as shown in FIG. 24 is displayed. In the example of display of FIG. 24, the name of the album is displayed, and the number of images recorded in the album of the name is displayed on the right side of the name of the album. In the example of display of FIG. 24, eight images are recorded in the "album 1" while nine images are recorded in the "album 3", but no image is recorded in the "album 2", "album 4" or "album 5".

The user will observe the list and operate the inputting section 77 to designate an album to be browsed or edited. When this designation is performed from the inputting section 77, the CPU 71 acquires designation information of the album designated by the user at step S98. Then at step S99, the CPU 71 transmits the album designation information acquired at step S98 to the camcorder image station 41. At this time, the camcorder image station 41 transmits an image of an index page of the album designated by the camcorder 11 (step S189 of FIG. 37 hereinafter described). Thus, at step S100, the CPU 71 receives the image of the index page transmitted from the camcorder image station 41, and at step S101, the CPU 71 outputs the image of the index page to the LCD 78 so as to be displayed.

Figure 25:
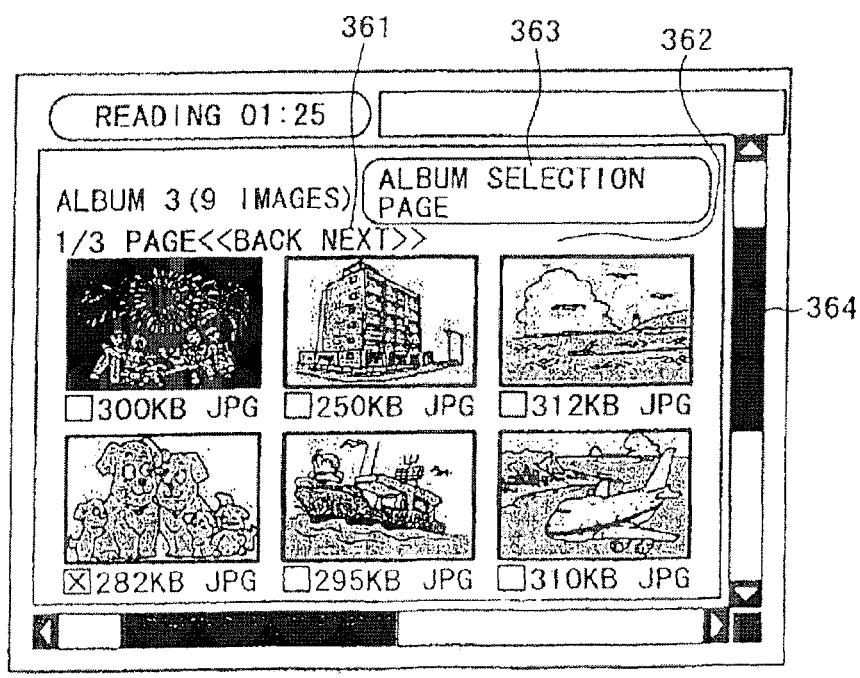
FIG. 25 is a view showing an example of display at step S101 of FIG. 21.

FIG. 25 shows an example of display in this instance. In the index page, thumbnail images of image data recorded in the album of the designated name are displayed. Further, below each of the thumbnail images, the data amount (kilobytes) of the image and the extension (JPG or the like) of the file representative of a compression method are displayed. Further, by checking a check box represented by a quadrangle indicated at a left lower location of each thumbnail image, the user can select the image.

At a left upper portion of the page, the name of the album and the number of images included in the album are indicated. In the example of FIG. 25, it is shown that the name of the album is "album 3" and nine images are included in the album. Further, on the lower side of the same, the page number of the index page is indicated.

The user can operate a back button 361 or a next button 362 to feed the page backwardly or forwardly. Further, if a scroll button 364 is operated, then the CPU 71 scrolls the image within the page. If an album selection page button 363 is operated, then the CPU 71 changes the display from the index page to an image of the album selection page shown in FIG. 24.

Figure 26:
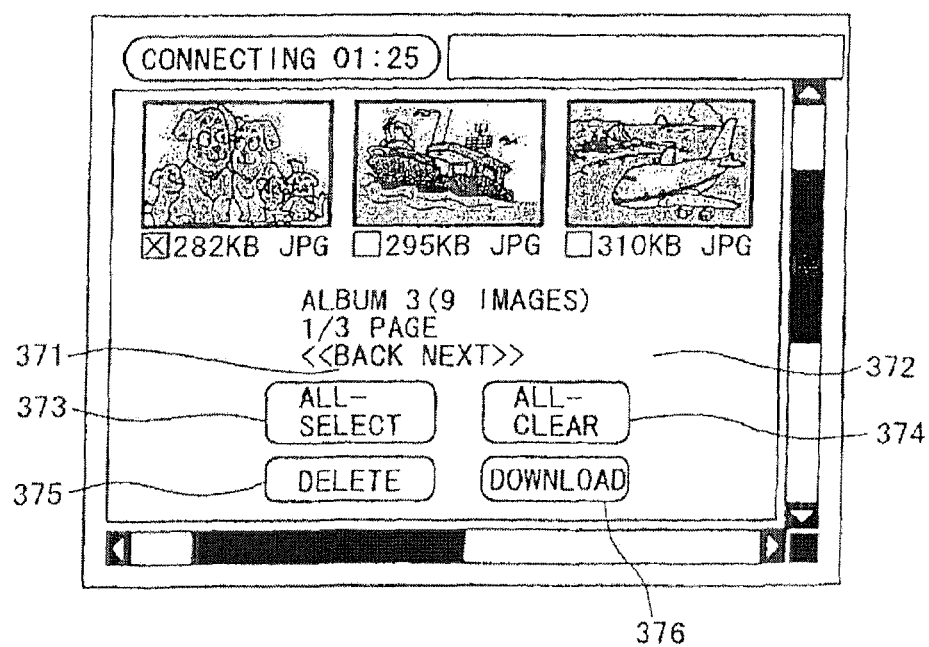
FIG. 26 is a view showing another example of display at step S101 of FIG. 21.

FIG. 26 shows an example of display where the index page is scrolled downwardly by operating the scroll button 364 in the state shown in FIG. 25. In the present example of display, the album name and the page number as well as a back button 371 and a next button 372 are displayed below the thumbnail images. The back button 371 and the next button 372 execute similar functions to those of the back button 361 and the next button 362 shown in FIG. 25, respectively.

An all-select button 373 is operated to select (check) all of the displayed thumbnail images. An all-clear button 374 is operated to clear all of the displayed thumbnail images.

A delete button 375 is operated to delete registration of image data corresponding to a checked one or ones of the thumbnail images. A download button 376 is operated to download original image data corresponding to a checked one or ones of the thumbnail images.

At step S102, the CPU 71 discriminates whether or not the album selection page button 363 is operated. If it is discriminated that the album selection-page button 363 is operated, then the processing returns to step S97, at which the CPU 71 controls the LCD 78 to display the album selection page shown in FIG. 24. Then, the processing at the steps following the step S97 is executed similarly as in the case described hereinabove.

If it is discriminated at step S102 that the album selection page button 363 is not operated, then the processing advances to step S103, at which the CPU 71 discriminates whether or not a thumbnail image (index image) is designated. Although details are hereinafter described above, if the user designates a predetermined thumbnail image, then data of a full image corresponding to the thumbnail image are transmitted from the camcorder image station 41.

If it is discriminated at step S103 that a thumbnail image is not designated, then the CPU 71 successively discriminates, at steps S104 to S109, whether or not the back button 361 or 371 is operated (step S104), whether or not the next button 362 or 372 is operated (step S105), whether or not the all-select button 373 is operated (step S106), whether or not the all-clear button 374 is operated (step S107), whether or not the download button 376 is operated (step S108) and whether or not the delete button 375 is operated (step S109). If none of the buttons mentioned is operated, then the processing returns to step S102 so that the processes at the steps beginning with step S102 are executed repetitively.

If it is discriminated at step S104 that the back button 361 or 371 is operated, then the processing advances to step S110, at which the CPU 71 causes the index page of the page preceding to the page displayed currently to be displayed. In this instance, if the back button 361 or 371 is operated in a state wherein the first page is displayed, then the last page is displayed.

If it is discriminated at step S105 that the next button 362 or 372 is operated, then the processing advances to step S111, at which the CPU 71 causes the succeeding index page to be displayed. If the next button 362 or 372 is operated in a state wherein the last page is displayed, then the top page is displayed.

If it is discriminated at step S106 that the all-select button 373 is operated, then the processing advances to step S112, at which the CPU 71 places all check boxes corresponding to the displayed thumbnail images into a checked state.

If it is discriminates at step S107 that the all-clear button 374 is operated, then the processing advances to step S113, at which the CPU 71 places all check boxes corresponding to the displayed thumbnail images into a check-cleared state (changes them into check boxes of a non-checked state).

If it is discriminated at step S108 that the download button 376 is operated, then the processing advances to step S114, at which the CPU 71 executes a download process. While details of the download process are hereinafter described with reference to a flow chart of FIG. 27, in this download process, a process of downloading original image data corresponding to a checked thumbnail image or images from the camcorder image station 41 is executed.

If it is discriminated at step S109 that the delete button 375 is operated, then the processing advances to step S115, at which the CPU 71 executes a deletion process. While details of the deletion process are hereinafter described with reference to a flow chart of FIG. 31, in this deletion process, a process of deleting registration of original image data corresponding to a checked thumbnail image or images from the album is executed.

After the processes at steps S110 to S115, the processing returns to step S102 so that the processes at the steps beginning with step S102 are executed repetitively.

Figure 27:
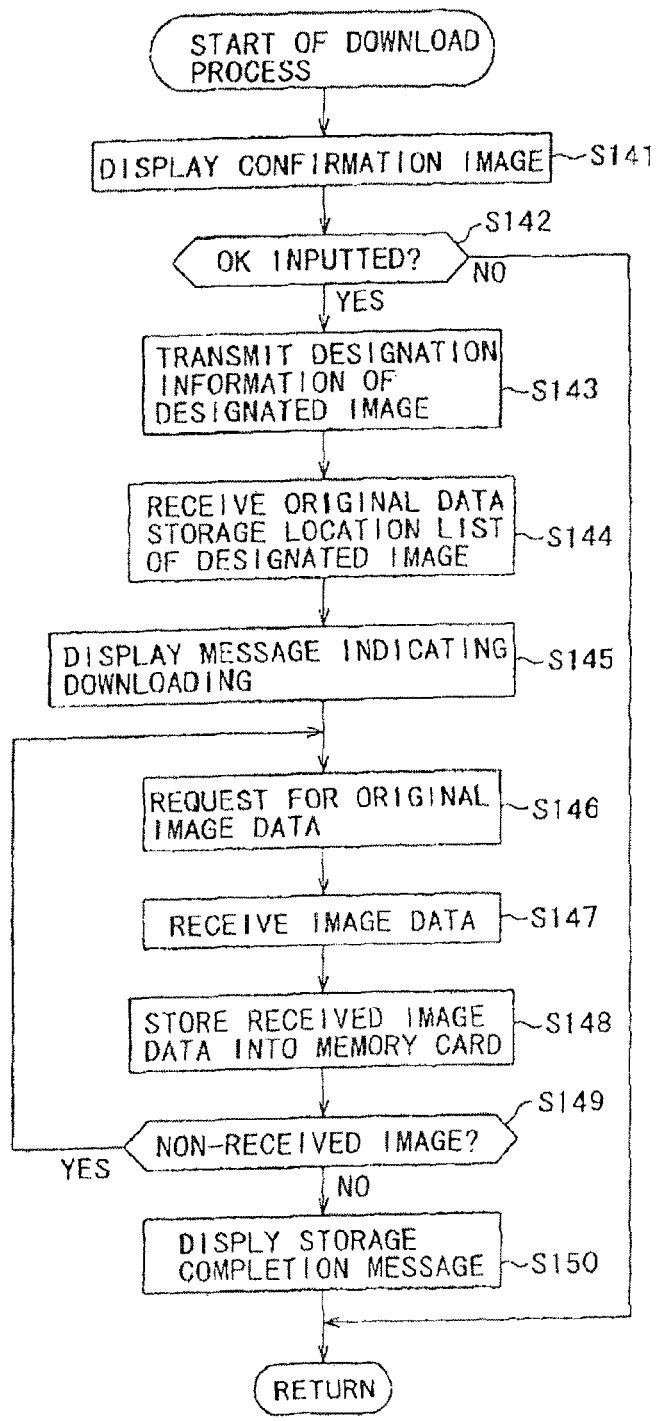
FIG. 27 is a flow chart illustrating details of a download process at step S114 of FIG. 22.

Here, details of the download process at step S114 are described with reference to a flow chart of FIG. 27.

Figure 28:
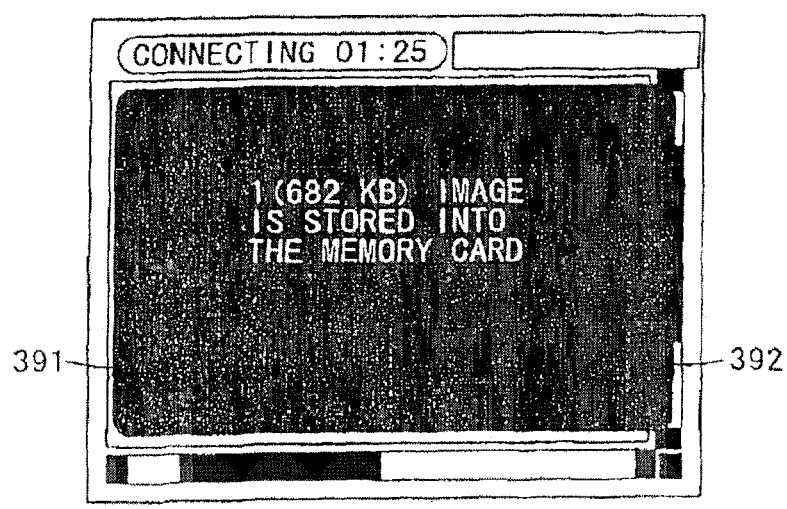
FIG. 28 is a view showing an example of display at step S141 of FIG. 27.

When the download button 376 is operated, the CPU 71 reads out confirmation image data stored in the ROM 72 and outputs the confirmation image data to the LCD 78 so as to be displayed at step S141. Consequently, for example, such a confirmation image as shown in FIG. 28 is displayed. In the example of display of FIG. 28, a message of "1 image (682 KB) is stored into the memory card" is displayed. This image is produced based on the Java® script alert transmitted from the camcorder image station 41 and stored in the RAM 73.

It is to be noted that, while, in this example, the display includes "1 image" because the number of checked thumbnails is 1, if the number of checked thumbnails is, for example, 5, then the display includes "5 images". Further, the displayed data amount represents the data amount of image data of the number of all images.

Further, in the example of display of FIG. 28, a cancel button 391 and an OK button 392 are displayed. To execute downloading, the user will operate the OK button 392, but to cancel such downloading, the user will operate the cancel button 391.

Thus, at step S142, the CPU 71 discriminates whether or not the OK button 392 is operated. If it is discriminated that the OK button 392 is not operated (if it is discriminated that the cancel button 391 is operated), then the CPU 71 ends the download process.

On the other hand, if it is discriminated that the OK button 392 is operated, then the processing advances to step S143, at which the CPU 71 transmits, to the camcorder image station 41, designation information of an image designated by the user by checking its check box. When the camcorder image station 41 receives the designation information, it transmits a designation information list of original image data of the designated image as hereinafter described (at step S193 of FIG. 37 hereinafter described).

Figure 29:
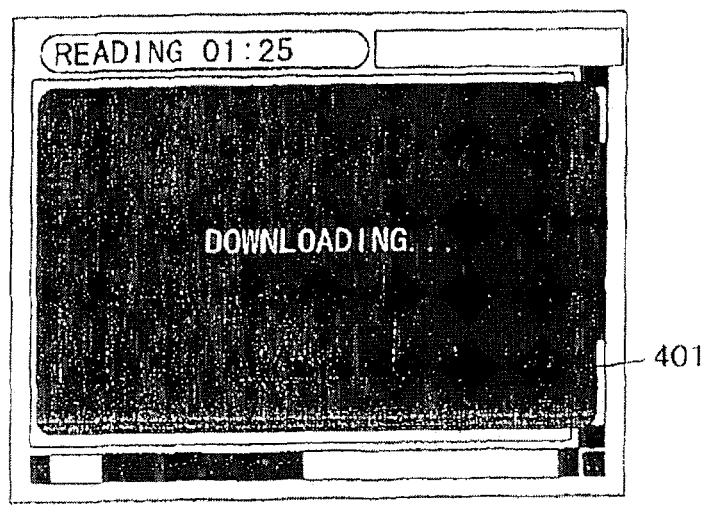
FIG. 29 is a view showing an example of display at step S145 of FIG. 27.

Thus, at step S144, the CPU 71 receives the designation information list of original image data transmitted from the camcorder image station 41 and stores the received designation information list into the RAM 73. At step S145, the CPU 71 causes the LCD 78 to display a message of "Downloading" as shown in FIG. 29.

In this display state, only a cancel button 401 is displayed. The user can operate the cancel button 401 to cancel the download process midway.

The CPU 71 requests, at step S146, the camcorder image station 41 to transmit original image data based on the original image designation information list received by the process at step S144.

The CPU 71 receives original image data transmitted from the camcorder image station 41 at step S147, and supplies the original image data to the memory card 85 through the memory card interface 84 so as to be stored at step S148. It is to be noted that the image data may be stored once into the RAM 73 such that, after all image data are received, they are stored into the memory card 85 collectively.

At step S149, the CPU 71 discriminates whether or not the original image designation list received by the process at step S144 includes image data which are not received as yet. If image data which are not received as yet are present, then the processing returns to step S146 so that the processes at the steps beginning with step S146 are executed repetitively.

If it discriminated at step S149 that all image data in the list are received already, then the processing advances to step S150, at which the CPU 71 controls the LCD 78 to display a storage completion message of "Stored" as shown in FIG. 30.

When the user looks at the storage completion message, he/she will operate an OK button 411 to acknowledge this. When the OK button 411 is operated, the CPU 71 ends the download process. Thereafter, the processing returns to step S102 of FIG. 22.

Figure 22:
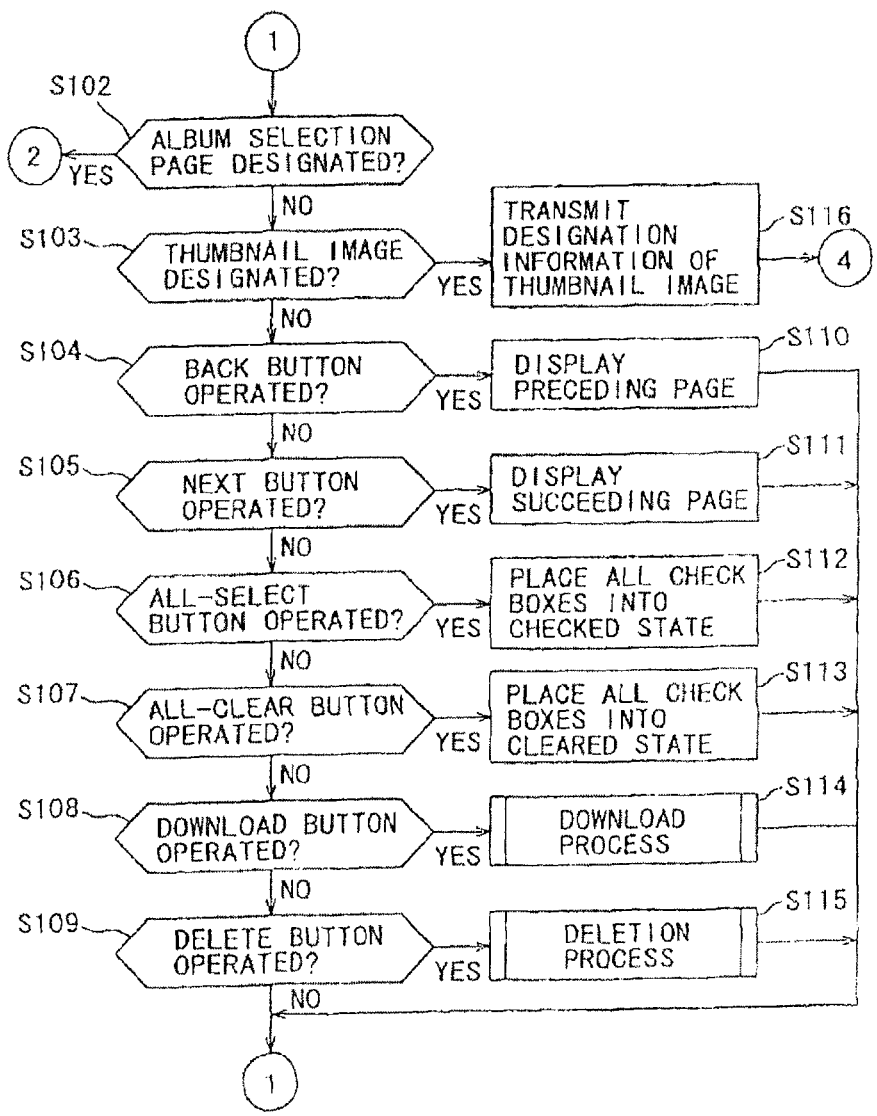
FIG. 22 is a flow chart illustrating details of the browse/edit process at step S36 of FIG. 8.

Now, details of the deletion process at step S115 of FIG. 22 are described with reference to a flow chart of FIG. 31.

Figure 32:
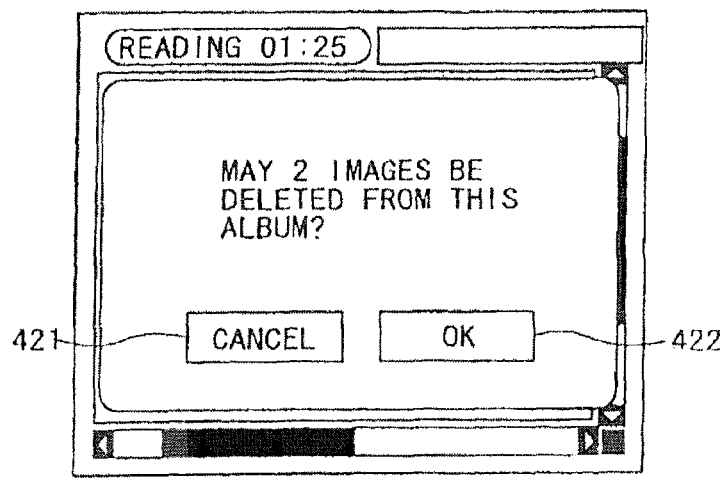
FIG. 32 is a view showing an example of display at step S161 of FIG. 31.

When the delete button 375 of FIG. 26 is operated, the CPU 71 produces such a confirmation screen as shown in FIG. 32 based on the Java® script alert and causes the LCD 78 to display the confirmation screen at step S161.

Figure 33:
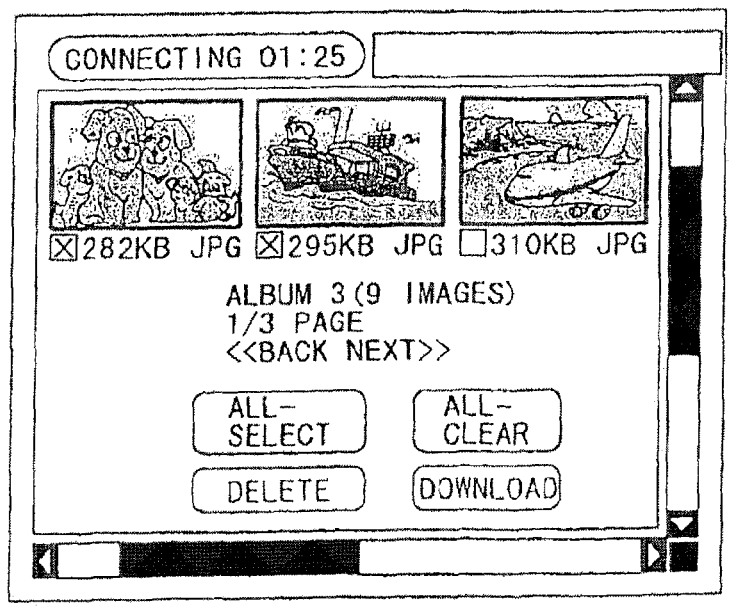
FIG. 33 is a view showing an example of display at step S164 of FIG. 31.

In the example of FIG. 32, a message of "May two images be deleted from this album?" is displayed. In particular, this image shows an example of display in a case wherein, where, for example, two thumbnail images are checked as shown in FIG. 33, the delete button 375 is operated, and the number of thumbnail images varies depending upon the number of checks placed in the check boxes.

In this confirmation image, a cancel button 421 and an OK button 422 are displayed. To execute deletion, the user will operate the OK button 422, but to cancel such deletion, the user will operate the cancel button 421.

Thus, at step S162, the CPU 71 discriminates whether or not the OK button 422 is operated. If it is discriminated that the OK button 422 is operated, then the processing advances to step S163, at which the CPU 71 transmits designation information of designating original images corresponding to the thumbnail image or images designated through the check boxes to the camcorder image station 41.

When the instruction of deletion of an image or images is received, the camcorder image station 41 executes deletion of original image data and transmits an image index page after completion of the deletion (at steps S197 and S198 of FIG. 37).

Thus, at step S164, the CPU 71 receives the index page after the deletion transmitted from the camcorder image station 41 and outputs the index page to the LCD 78 so as to be displayed.

Figure 34:
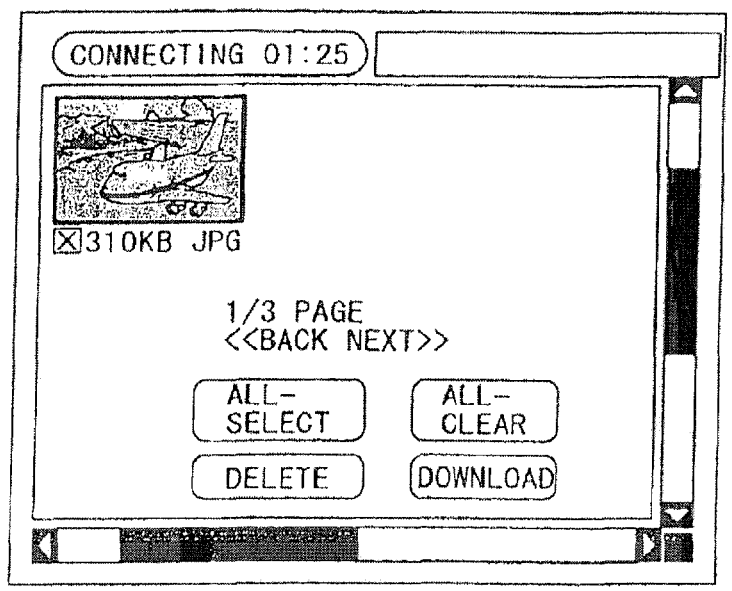
FIG. 34 is a view showing another example of display at step S164 of FIG. 31.

FIG. 34 shows an example of display in this instance. Since two thumbnail images on the left side in FIG. 33 are checked and original image data of the two thumbnail images are deleted, only the image displayed on the rightmost position in FIG. 33 is displayed in the example of display of FIG. 34.

If it is discriminated at step S162 that the OK button 422 is not operated (if it is discriminated that the cancel button 421 is operated), then the processes at steps S163 and S164 are skipped. In other words, in this instance, the deletion process is stopped.

Referring back to FIG. 22, if it is discriminated at step S103 that a thumbnail image is designated in the state illustrated in FIG. 25 or 26, then the processing advances to step S116, at which the CPU 71 transmits designation information designating the thumbnail image to the camcorder image station 41.

When the camcorder image station 41 receives the designation information of the thumbnail image, it transmits a page (full image page) of a full image of the designated thumbnail image (at step S191 of FIG. 37 hereinafter described).

The CPU 71 receives the full image page transmitted from the camcorder image station 41 at step S117, and outputs the full image page to the LCD 78 so as to be displayed at step S118.

Figure 35:
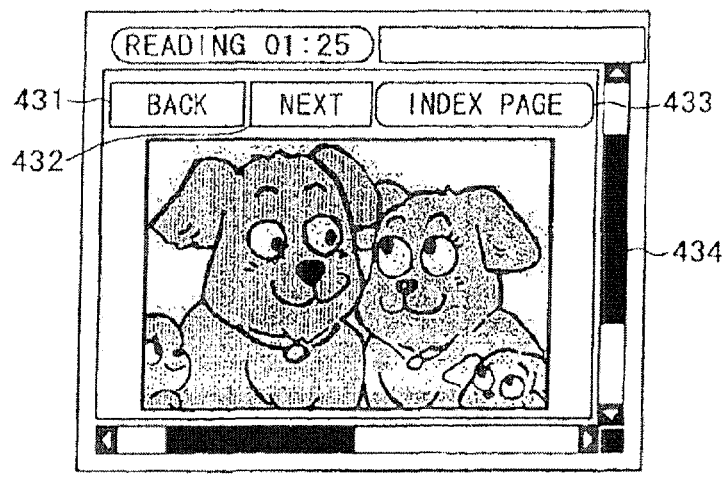
FIG. 35 is a view showing an example of display at step S117 of FIG. 23.

FIG. 35 shows an example of display in this instance. In this example of display, a full image of the image shown at the leftmost position in FIG. 36 is displayed. If the user operates a back button 431 or a next button 432, then designation information of a preceding or succeeding image is transmitted. In response to this, a preceding or succeeding full image is transmitted from the camcorder image station 41. The CPU 71 receives the full image page. Consequently, the full image preceding or succeeding by one can be displayed. If an index page button 433 is operated, then the CPU 71 controls the LCD 78 to display such an index page as shown in FIG. 25 or 26.

On the other hand, if the user operates a scroll button 434, then the full image is scrolled. FIG. 36 shows an example of display where the full image is scrolled upwardly when the user operates the scroll button 434 in the state shown in FIG. 35.

In the example of display of FIG. 36, a back button 441 and a next button 442 are displayed below the full image. These buttons have functions similar to those of the back button 431 and the next button 432 shown in FIG. 35, respectively.

Further, below the buttons, the data amount (file size) of the full image and the extension (representative of the compression method) of the file are displayed. In this example, the file size is 282 KB and the extension is JPG.

Further below them, a delete button 443 and a download button 444 are displayed. When the delete button 443 is operated, original image data corresponding to the full image displayed are deleted, but when the download button 444 is operated, original image data corresponding to the full image displayed are transmitted.

When the download button 376 is operated in FIG. 26, information which designates original image data corresponding to an image or images checked in the check boxes of the index page is transmitted, and the CPU 71 transmits such designation information for each one image and receives an original image from the camcorder image station 41. Then, after storage of the original image is completed, the CPU 71 repeats the processes from transmission of designation information and reception of a next one image.

Similarly, if the download button 444 shown in FIG. 36 is operated, then information which designates original image data corresponding to the full image displayed is transmitted to the camcorder image station 41, and original image data corresponding to the full image transmitted the camcorder image station 41 are downloaded into the camcorder 11.

Although the image shown in FIG. 35 or 36 is a full image, this image is a reduced image edited for the camcorder 11 as a portable terminal equipment. In other words, the LCD 78 cannot display such a large image as is displayed on; for example, a display unit for a personal computer of the desk top type. Therefore, the camcorder image station 41 has image data edited from original image data so that an image can be displayed in an optimum state on the LCD 78 of the camcorder 11. Although image data corresponding to the images shown in FIGS. 25 and 26 or FIGS. 35 and 36 are stored once in the RAM 73, the image data are image data edited for the LCD 78 which merely has a small display area. Image data downloaded when the download button 376 or 444 is operated are original image data before such editing is performed.

The CPU 71 successively discriminates, at steps S119 to S123, whether or not the back button 431 or 441 is operated (step S119), whether or not the next button 432 or 442 is operated (step S120), whether or not the download button 444 is operated (step S121), whether or not the delete button 443 is operated (step S122) and whether or not the index page button 433 is operated (step S123). If it is discriminated that none of the buttons is operated, then the processing returns to step S119 so that the processes at the steps beginning with step S119 are repeated.

If it is discriminated at step S119 that the back button 431 or 441 is operated, then the processing advances to step S124, at which the CPU 71 transmits image information of a page preceding to the full image page to the camcorder image station 41. In response to this, corresponding image data are transmitted from the camcorder image station 41, and consequently, the CPU 71 receives the image data at step S117. This full image page is displayed at step S118 by a process similar to that where a thumbnail image is selected from an index page.

If it is discriminated at step S120 that the next button 432 or 442 is operated, then the processing advances to step S125, at which the CPU 71 transmits information which designates an image of a page succeeding to the full image page to the camcorder image station 41 and executes a process similar to that when the back button 431 or 441 is operated so that a next image is displayed.

If the back button 431 or 441 is operated at step S124 in a state wherein the top page is displayed, then the last page is displayed. Similarly, if the next button 432 or 442 is operated at step S125 in a state wherein the last page is displayed, then the top page is displayed.

If it is discriminated at step S121 that the download button 444 is operated, then the processing advances to step S126, at which a download process is executed. This download process is a process similar to that illustrated in the flow chart of FIG. 27.

If it is discriminated at step S122 that the delete button 443 is operated, then the processing advances to S127, at which a deletion process is executed. This deletion process is similar to the process illustrated in the flow chart of FIG. 31. In this instance, however, a full image page when the next button 432 or 442 is operated at step S120 is received and displayed at step S164.

Further, in the download process at step S126 or the deletion process at step S127, a download process or a deletion process of original image data of one image corresponding to the full image being displayed currently is executed.

Figure 21:
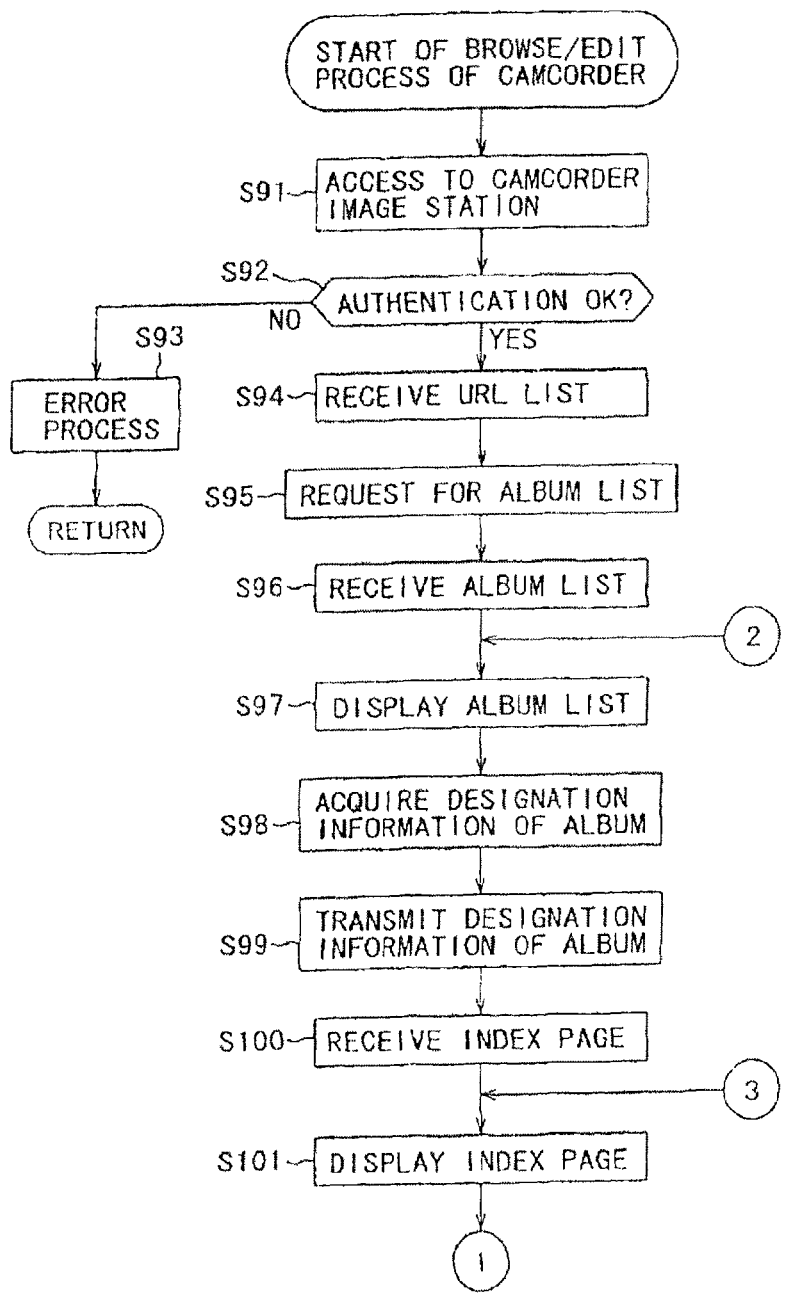
FIG. 21 is a flow chart illustrating details of a browse/edit process at step S36 of FIG. 8.

If it is discriminated at step S123 that the index page button 433 is operated, then the processing returns to step S101 of FIG. 21, at which the CPU 71 controls the LCD 78 to display the index page. Thereafter, the processes at the succeeding steps are executed.

After the process at step S126 or step S127, the processing returns to step S119 so that the processes at the steps beginning with step S119 are executed repetitively.

Figure 23:
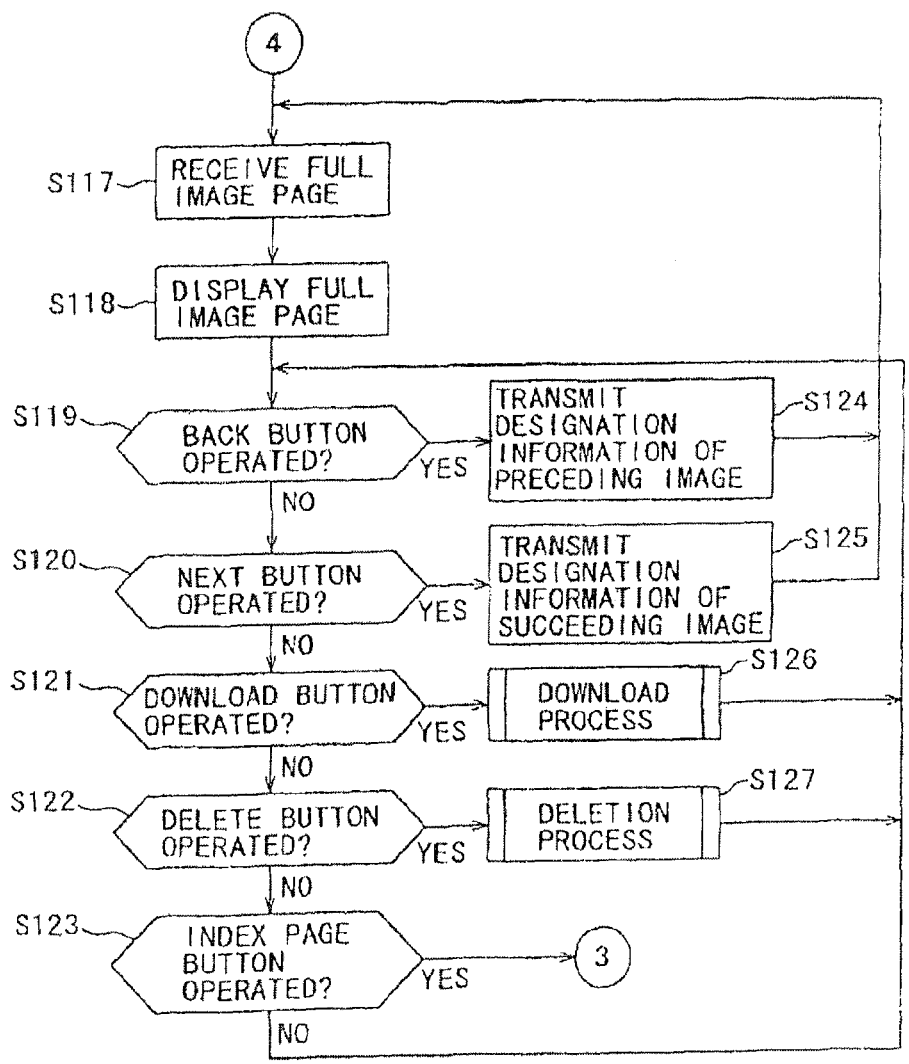
FIG. 23 is a flow chart-illustrating details of the browse/edit process at step S36 of FIG. 8.

Now, a process of the camcorder image station 41 executed in a corresponding relationship to the browse/edit process of the camcorder 11 illustrated in FIGS. 21 to 23 is described with reference to a flow chart of FIG. 37.

When the CPU 151 is accessed from the camcorder 11 at step S181, it receives authentication data transmitted thereto from the camcorder 11 at step S182. At step S183, the CPU 151 confirms the authentication data received at step S182 based on a database stored in the storage section 158.

Then, the CPU 151 discriminates at step S184 whether or not the authentication is OK. If the authentication is not OK, then the processing advances to step S185, at which the CPU 151 transmits an authentication NG signal to the camcorder 11.

If it is discriminated at step S184 that the authentication is OK, then the processing advances to step S186, at which the CPU 151 transmits an authentication OK signal and a URL list to the camcorder 11.

The processes at steps S181 to S186 described above are processes similar to those at steps S71 to S75 and S80 in FIG. 19.

After an authentication OK signal and a URL list are transmitted to the camcorder 11 at step S186, the camcorder 11 receives them and issues a request for an album list (step S95 of FIG. 21). Thus, when the CPU 151 receives this request at step S187, it reads out an album list of albums registered in a folder held for the user from whom it is accessed from the storage section 158 and transmits the album list from the communication section 159 at step S188.

As described hereinabove with reference to FIG. 24, this album list includes the names of the albums included in the folder, and the number of images stored in each of the albums of the names.

As described above, the user will designate a predetermined album based on the album list (at step S99 of FIG. 21).

Thus, at step S189, the CPU 151 reads out thumbnail images of image data of the designated album from the storage section 158, attaches the thumbnail images to the index page (produces an index page) and transmits the index page from the communication section 159 to the camcorder 11. Consequently, such an image of the index page as shown in FIG. 25 or 26 is displayed on the camcorder 11 in such a manner as described.

Figure 31:
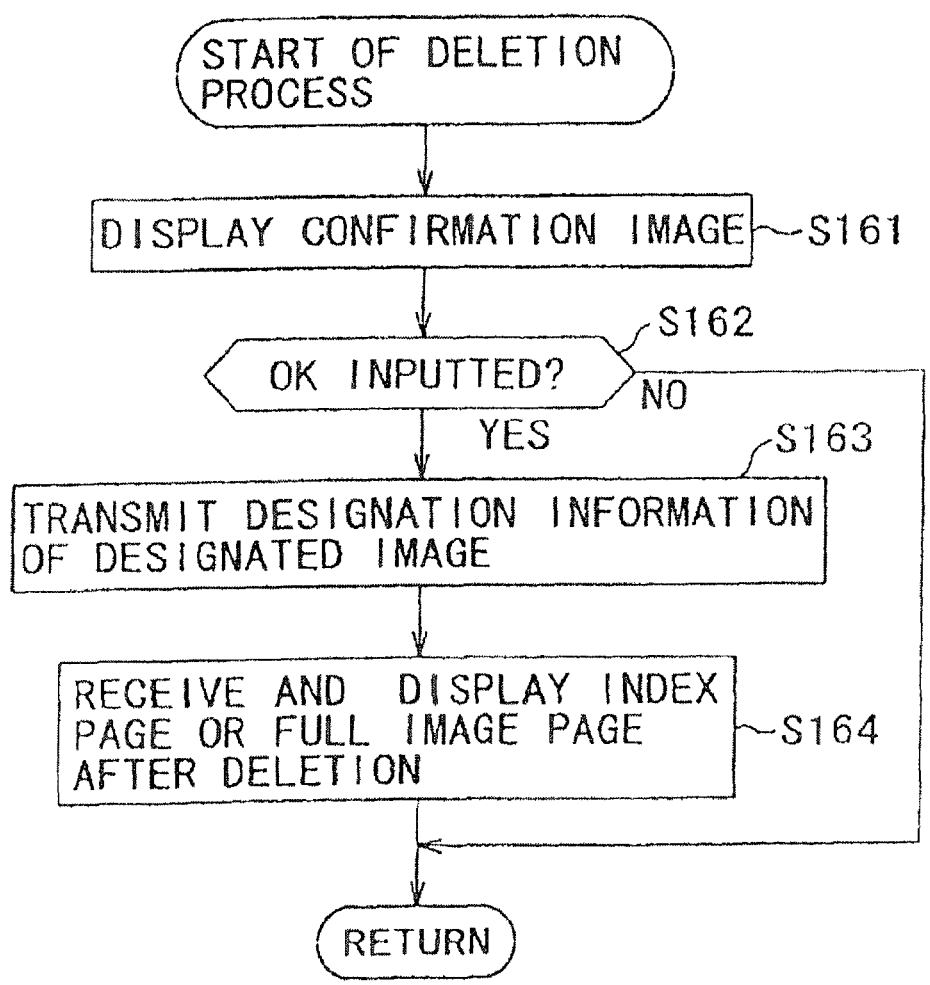
FIG. 31 is a flow chart illustrating details of a deletion process at step S115 of FIG. 22.

In this state, either information which designates a thumbnail image is transmitted from the camcorder 11 (step S116 of FIG. 22), or designation information which designates an image to be downloaded is transmitted (step S143 of FIG. 27), or else designation information of an original image to be downloaded is transmitted (step S146 of FIG. 27), or otherwise designation information which designates an image to be deleted is transmitted (step 163 of FIG. 31).

Then, the CPU 151 discriminates at steps S190, S192, S194 and S196 whether or not designation information of a thumbnail image is received from the camcorder 11 (step S190), whether or not designation information of an image to be downloaded is received (step S192), whether or not designation information of an original image to be downloaded is received (step S194) and whether or not designation information of an image to be deleted is received (step S196), respectively. If it is discriminated that none of such signals is received, then the processing returns to step S190 so that the processes at the steps beginning with step S190 are executed repetitively.

If it is discriminated at step S190 that designation information of a thumbnail image is received, then the processing advances to step S191, at which the CPU 151 reads out an image of a full image page of the designated thumbnail image from the storage section 158 and controls the communication section 159 to transmit the read out image to the camcorder 11. As described hereinabove, the image of the full image page transmitted by the present process is image data of an image edited (reduced) for the LCD 78 of the camcorder 11 different from the original image data.

If it is discriminated at step S192 that designation information of an image to be downloaded is received, then the processing advances to step S193, at which the CPU 151 reads out designation information of the designated original image from the storage section 158 and transmits the designation information.

If it is discriminated at step S194 that designation information of an original image to be downloaded is received, then the CPU 151 reads out data of the designated image from the storage section 158 and transmits the data at step S195. As described above, the image data are original image data before edited different from the image data transmitted at step S191.

If it is discriminated at step S196 that designation information of an image to be deleted is received, then the processing advances to step S197, at which the CPU 151 causes original image data of the designated image to be deleted from the corresponding album of the storage section 158. When the deletion process is completed, the processing advances to step S198, at which the CPU 151 produces an index page of the image after the completion of deletion and transmits the index page to the camcorder 11.

After the process at step S191, S193, S195 or S198, the processing returns to step S190 so that the processes at the steps beginning with step S190 are executed repetitively.

While the foregoing description is given taking a portable video tape recorder of the type integrated with a camera as an example of a portable terminal equipment, the present invention can be applied also to other portable terminal equipments such as a digital still camera and a portable telephone set with a camera.

While the series of processes described above can be executed by hardware, it may otherwise be executed by software. Where the series of processes is executed by software, a program which constructs the software is installed from a network or a recording medium into a computer incorporated in hardware for exclusive use or, for example, a personal computer for universal use which can execute various functions by installing various programs.

The recording medium is not only formed as a package medium such as, as shown in FIGS. 4 to 7, a magnetic disk 91 (including a floppy disk), 131, 171 or 211, an optical disk 92 (including a CD-ROM (Compact Disk-Read Only Memory) and a DVD (Digital Versatile Disk)), 132, 172 or 212, or a magneto-optical disk 93 (including an MD (Mini-Disk)), 133, 173 or 213, or a semiconductor memory 94, 134, 174 or 214 or the like which has the program recorded thereon or therein and is distributed to provide the program separately from an apparatus body, but also formed as a ROM 72112, 152 or 192 or a hard disk included in the storage section 118, 158 or 198 in which the program is stored and which is provided to a user in a state wherein it is incorporated in an apparatus body in advance.

It is to be noted that, in the present specification, the steps which describe the program stored in a recording medium may be but need not necessarily be processed in a time series in the order as described, and include processes which are executed in parallel or individually without being processed in a time series.

Further, in the present specification, the system represents an entire apparatus formed from a plurality of apparatus.

INDUSTRIAL APPLICABILITY

As described above, with the information processing system of the present invention, since a predetermined number of folders each having a name determined in advance are held in a corresponding relationship to each user such that, when a folder of a predetermined name is designated from one of the users, information is stored into the folder, a system wherein each of the users can store information from an apparatus, with which it is not comparatively easy to input a name, simply and with certainty can be implemented.

With the first information processing apparatus and method, recording medium and program of the present invention, since user information is stored into a folder designated by designation information transmitted from a different information processing apparatus, user information from such a different information processing apparatus with which it is comparatively difficult to input a name can be stored without causing the user to feel inconvenience.

With the second information processing apparatus and method, recording medium and program of the present invention, since, in order that a different information processing apparatus may hold user information, a list of folders held in a corresponding relationship to a user is held such that a predetermined folder is designated from within the list and transmitted to the different information processing apparatus together with user information, user information can be registered into the different information processing apparatus simply also from an apparatus with which it is not comparatively easy to input a name.

The invention claimed is:

1. An information processing apparatus comprising:
a storage unit at the information processing apparatus configured to store a pre-set plurality of folders, each folder being associated with a respective one of a plurality of users and each folder configured to store a plurality of pre-set albums registered in advance in a respective folder stored in the storage unit, the pre-set albums being listed in a pre-registered list of albums in an information processing device used by the respective user, the storage unit being configured to store user information including image data from the information processing devices used by the respective user;
a reception unit configured to be connected through a network to the user's information processing device to receive through the network the user information and designation information transmitted from the information processing device used by the respective user, the designation information being generated prior to the connection to the user's information processing device and designating one of the pre-set albums stored in the folder associated with the respective user and being selected by the user from the pre-registered list in the information processing device used by the user;
a recording unit configured to record in the designated album the user information including the image data received by the reception unit; and
a registering unit configured to register in the designated album selected image data selectively accessible by other users,
wherein the information processing apparatus is a central storage station and the information processing devices used by the user are portable terminal apparatuses,
wherein an ID and a password are required for the portable terminal apparatus to access the network, the ID and the password being used for accessing the central storage station,
wherein a list of the albums stored in the folder associated with the user is pre-registered in the portable terminal apparatus used by the user and the list of albums also is stored in the central storage station,
wherein the reception unit receives an instruction to invite other users to access the registered selected data,
wherein the instruction includes text information and addresses of the other users, and
wherein the image data registered in the designated album is accessible by the other users whose addresses are included in the received instruction.

2. An information processing apparatus according claim 1, wherein the information processing device is a video camera.

3. An information processing method performed by a central storage station, comprising the steps of:
storing at the central storage station a pre-set plurality of folders, each folder being associated with a respective one of a plurality of the users and each folder configured to store a plurality of pre-set albums registered in advance in a respective folder stored at the central storage station, the pre-set albums being listed in a pre-registered list of albums in a portable terminal apparatus used by the respective user, and storing user information including image data from the portable terminal apparatus used by the respective user;
receiving through a network the user information and designation information transmitted from the portable terminal apparatus used by the respective user, the designation information being generated prior to the connection to the user's portable terminal apparatus to the network and designating one of the pre-set albums stored in the folder associated with the respective user, the designation information being selected by the user from the pre-registered list in the portable terminal apparatus used by the user;
recording in the designated folder the received user information including the image data; and
registering in the designated folder selected image data selectively accessible by other users,
wherein an ID and a password are required for the portable terminal apparatus to access the network, the ID and the password being used for accessing the central storage station,
wherein a list of the albums stored in the folder associated with the user is pre-registered in the portable terminal apparatus used by the user and the list of albums also is stored in the central storage station,
wherein the receiving step receives an instruction to invite other users to access the registered selected data,
wherein the instruction includes text information and addresses of the other users, and wherein the image data registered in the designated album is accessible by the other users whose addresses are included in the received instruction.

4. A non-transitory computer-readable recording medium for storing a computer program that when executed on a computer causes information processing, the program comprising the steps of:

storing at a central storage station a pre-set plurality of folders, each folder being associated with a respective one of a plurality of the users and each folder configured to store a plurality of pre-set albums registered in advance in a respective folder stored at the central storage station, the pre-set albums being listed in a pre-registered list of albums in a portable terminal apparatus used by the respective user, and storing user information including image data from the portable terminal apparatus used by the respective user;

receiving through a network the user information and designation information transmitted from the portable terminal apparatus used by the respective user, the designation information being generated prior to the connection to the user's portable terminal apparatus to the network and designating one of the pre-set albums stored in the folder associated with the respective user, the designation information being selected by the user from the pre-registered list in the portable terminal apparatus used by the user;

recording in the designated folder the received user information including the image data; and registering in the designated folder selected image data selectively accessible by other users, wherein an ID and a password are required for the portable terminal apparatus to access the network, the ID and the password being used for accessing a central storage station, wherein a list of the albums stored in the folder associated with the user is pre-registered in the portable terminal apparatus used by the user and the list of albums also is stored in the central storage station, wherein the receiving step receives an instruction to invite other users to access the registered selected data, wherein the instruction includes text information and addresses of the other users, and wherein the image data registered in the designated album is accessible by the other users whose addresses are included in the received instruction.

5. A portable terminal apparatus comprising:

a storage unit configured to store a pre-set list of a plurality of folders, each folder being stored at a central storage location, each folder being associated with a user and each folder configured to store a plurality of albums, the storage unit at the portable terminal apparatus storing a list of a plurality of pre-set albums, the list being registered in advance at the portable terminal apparatus;

a designation unit configured to designate a predetermined folder from the stored list and to designate from the list of albums one of the pre-set albums in the predetermined folder selected by the user;

a transmission unit configured to be connected via a network to the central storage location to transmit to the central storage location through the network designation information which designates the predetermined folder and the selected pre-set album designated by the designation unit and to transmit user information including image data to be stored in the pre-set album in the designated predetermined folder, the designation information being generated before the transmission unit is connected to the central storage location;

a registering unit configured to register in the designated album selected image data selectively accessible by other users, wherein an ID and a password are required for the portable terminal apparatus to access the network, the ID and the password also being used for accessing the central storage station, wherein the list of albums stored in the folder associated with the user is pre-registered in the portable terminal apparatus and the albums identified in the list of albums are stored in the central storage station, wherein the transmission unit transmits an instruction to invite other users to access the registered selected image data, wherein the instruction includes text information and addresses of the other users, and wherein the image data registered in the designated album is accessible by the other users whose addresses are included in the received instruction.

6. An information processing apparatus according claim 5, wherein the information processing apparatus is a video camera.

7. An information processing method comprising the steps of:

storing, at a portable terminal apparatus, a pre-set list of a plurality of folders, each folder being stored at a central storage station, each folder being associated with a user and each folder configured to store a plurality of albums, the storage unit at the portable terminal apparatus storing a list of a plurality of pre-set albums, the list being registered in advance at the portable terminal apparatus;

designating a predetermined folder from the stored list and designating from the list of albums one of the pre-set albums in the predetermined folder selected by the user;

connecting to a network and transmitting, through the network to the central storage station, designation information which designates the predetermined folder and the selected pre-set album designated by the designating step and transmitting user information including image data to be stored in the pre-set album in the designated predetermined folder, the designation information being generated before the portable terminal apparatus is connected to the central storage location;

registering in the designated album selected image data selectively accessible by other users, wherein an ID and a password are required for the portable terminal apparatus to access the network, the ID and the password also being used for accessing the central storage station, wherein the list of albums stored in the folder associated with the user is pre-registered in the portable terminal apparatus and the albums identified in the list of albums are stored in the central storage station, wherein an instruction to invite other users to access the registered selected image data is transmitted, wherein the instruction includes text information and addresses of the other users, and wherein the image data registered in the designated album is accessible by the other users whose addresses are included in the received instruction.

8. A non-transitory computer-readable recording medium for storing a computer program that when executed on a computer causes information processing, the program comprising the steps of:

storing, at a portable terminal apparatus, a pre-set list of a plurality of folders, each folder being stored at a central storage station, each folder being associated with a user and each folder configured to store a plurality of albums, and storing at the portable terminal apparatus a list of a plurality of pre-set albums, the list being registered in advance at the portable terminal apparatus;

designating a predetermined folder from the stored list and designating from the list of albums one of the pre-set albums in the predetermined folder selected by the user;

connecting to a network and transmitting, through the network to the central storage station, designation information which designates the predetermined folder and the selected pre-set album designated by the designating step and transmitting user information including image data to be stored in the pre-set album in the designated predetermined folder, the designation information being generated before the portable terminal apparatus is connected to the central storage location;

registering in the designated album selected image data selectively accessible by other users, wherein an ID and a password are required for the portable terminal apparatus to access the network, the ID and the password also being used for accessing the central storage station, wherein the list of albums stored in the folder associated with the user is pre-registered in the portable terminal apparatus and the albums identified in the list of albums are stored in the central storage station, wherein an instruction to invite other users to access the registered selected image data is transmitted, wherein the instruction includes text information and addresses of the other users, and wherein the image data registered in the designated album is accessible by the other users whose addresses are included in the received instruction.

* * * * *